United States Patent
Isshiki et al.

(10) Patent No.: US 7,187,643 B2
(45) Date of Patent: Mar. 6, 2007

(54) INFORMATION RECORDING MEDIUM, INFORMATION REPRODUCING METHOD, AND INFORMATION REPRODUCING APPARATUS

(75) Inventors: Fumio Isshiki, Kokubunji (JP); Tetsuya Nishida, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 559 days.

(21) Appl. No.: 10/335,896

(22) Filed: Jan. 3, 2003

(65) Prior Publication Data
US 2003/0218955 A1 Nov. 27, 2003

(30) Foreign Application Priority Data
May 22, 2002 (JP) .............................. 2002-147489

(51) Int. Cl.
*G11B 7/24* (2006.01)
(52) U.S. Cl. .................. 369/275.4; 369/59.11
(58) Field of Classification Search ............. 369/59.11, 369/59.12, 47.17, 53.33, 124.02
See application file for complete search history.

(56) References Cited

U.S. PATENT DOCUMENTS 5,809,004 A * 9/1998 Kobayashi et al. ...... 369/275.3
6,510,116 B1 * 1/2003 Miyagawa et al. ...... 369/59.12
6,545,965 B1 * 4/2003 Hayashi ................... 369/59.12
6,584,054 B2 * 6/2003 Furukawa et al. ........ 369/59.11
6,735,160 B1 * 5/2004 Miyashita et al. ........ 369/59.12

FOREIGN PATENT DOCUMENTS

| JP | 6-76303 | 3/1994 |
| JP | 11-353652 | 12/1999 |
| JP | 2000-207747 | 7/2000 |

OTHER PUBLICATIONS

Toshio Goto et al, The Institute of Electronics, Information and Communication Engineers—Technical Report of IEICE, vol. 99, No. 573, MR99-76, 2000, pp. 1-8.

* cited by examiner

*Primary Examiner*—William Korzuch
*Assistant Examiner*—Adam R. Giesy
(74) *Attorney, Agent, or Firm*—Mattingly, Stanger, Malur & Brundidge, P.C.

(57) ABSTRACT

A high recording-density and highly reliable optical disc according to the two-dimensional PRML system is provided in which periodic signal fluctuations in the readout signal caused by an overall positional displacement of pits between adjacent tracks can be detected at each sampling clock timing and can be tracked and compensated. Two-dimensional inter-symbol interference is compensated during the production and recording of the pattern of the medium. The readout signal is compensated by a process of multi-value tracking before symbols are extracted from the signal.

12 Claims, 18 Drawing Sheets

WITH ISI COMPENSATION

WITHOUT ISI COMPENSATION

WITH ISI COMPENSATION

WITHOUT ISI COMPENSATION

FIG.11A
WITH ISI COMPENSATION
FIG.11B
WITHOUT ISI COMPENSATION
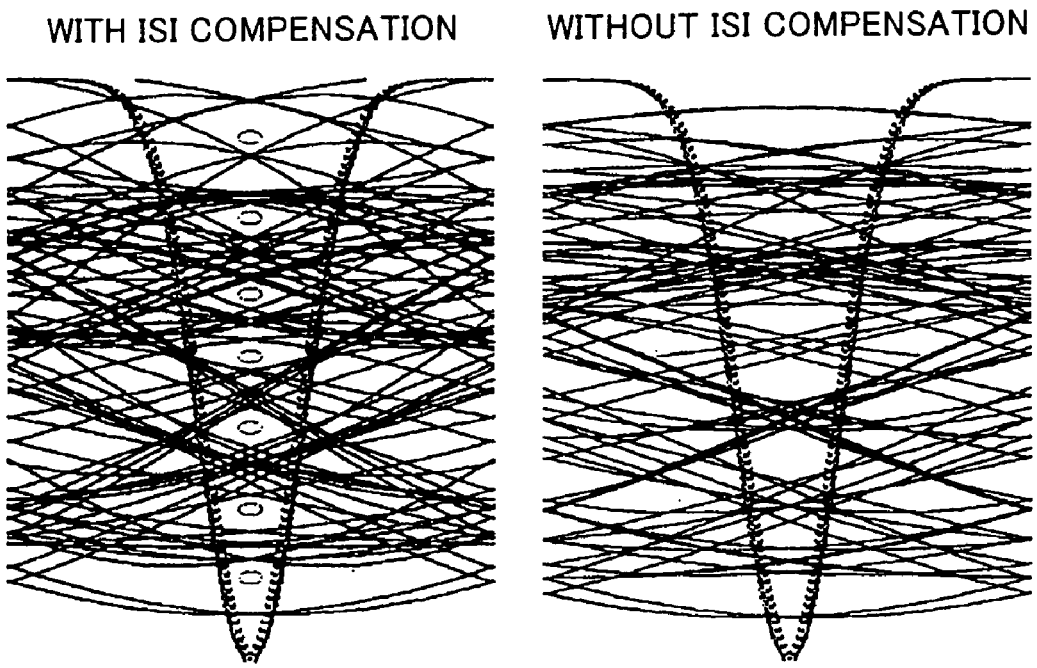
FIG.12 PRIOR ART
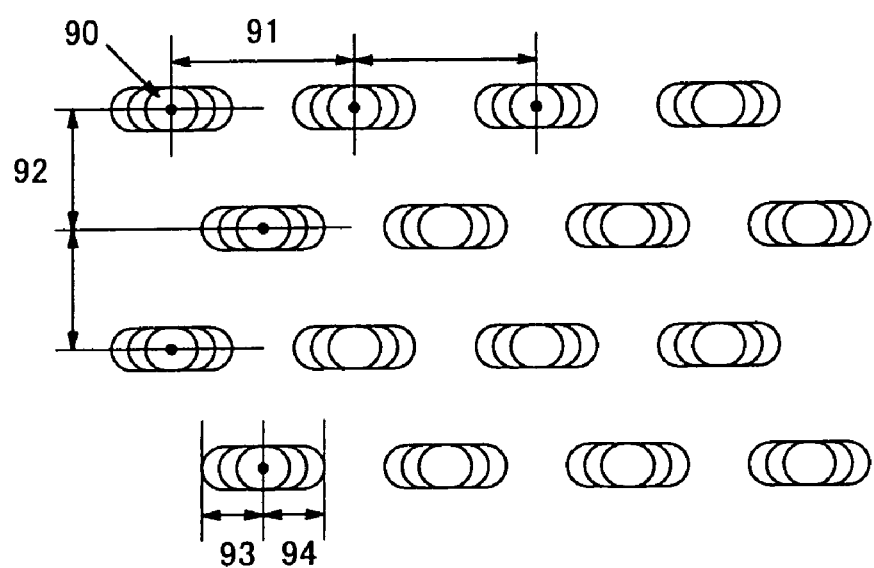

↓ 7

↓ 7

↓ 7

INFORMATION RECORDING MEDIUM, INFORMATION REPRODUCING METHOD, AND INFORMATION REPRODUCING APPARATUS

BACKGROUND OF THE INVENTION

1. Technical Field

The present invention relates to an optical disc medium, a method of optically reproducing information recorded on an optical disc, and an optical disc apparatus.

2. Background Art

There are various formats and reproduction technologies developed for increasing the recording density of optical discs by employing different readout methods from those for the optical discs that have so far been put to practical use. These newer technologies for recording density improvement according to the prior art include (1) a multi-value recording technique whereby a plurality of bit information items are recorded at a single mark edge; (2) narrowing of the intervals of tracks (track pitch) in which information is written; and (3) narrowing of the intervals (mark pitch) of the minute marks in which information is recorded.

As an example of the multi-value recording technique, JP Patent Publication (Unexamined Application) No. 6-76303 discloses a method of reading multi-value information recorded on a disc. According to this method, the disc is scanned with an optical spot over a mark along the track to produce an optical readout signal (RF signal) corresponding to the position of a recorded mark edge, and multi-value information recorded at the edge is read from the waveform of the RF signal. The publication also describes a method of compensating a one-dimensional non-linear inter-symbol interference by employing a learning pattern, so that the coded information can be decoded accurately. Another method of compensating the one-dimensional inter-symbol interference on a medium pattern is disclosed in JP Patent Publication (Nonexamined Application) No. 11-353652.

JP Patent Publication (Unexamined Application) No. 10-74322 discloses an example of the technique of narrowing the track pitch. In this example, the track pitch is set at a value smaller than the size (diameter) of the optical spot used for readout. The optical spot scans not immediately above a track but at an intermediate position between two adjacent tracks. Pit patterns for the two tracks are simultaneously read by an optical readout signal, and the information recorded in the individual tracks is decoded separately by signal processing. This separate decoding method is called a one-dimensional PRML (Partial Response Maximum Likelihood).

JP Patent Publication (Nonexamined Application) No. 2000-207747 discloses an example of the technique of narrowing the mark pitch in each track. In this example, the recording density of an optical disc is increased by making both the mark pitch and the track pitch smaller than the optical spot diameter. When playing back the disc, a single optical spot simultaneously captures four pit edges in a checkered, alternating bit pattern. The multi-value information recorded at the four pit edges is read by an optical readout signal and processed to decode the information recorded at each pit edge separately. This separation and decoding method is called a two-dimensional PRML.

The above method disclosed in JP Patent Publication (Nonexamined Application) No. 2000-207747 will be hereafter described by referring to FIGS. 2 to 4.

The pits are drawn on a disc original by an electron-beam drawing apparatus such that they are arranged on the optical disc as shown in FIG. 2. The regions having no pits are called mirror regions or areas. The pits include a synchronization pit 1 for signal synchronization, a reference pit 2 for level compensation, a servo pit 3 for detecting misalignment from the right track position, and a data pit 4 for recording data. The reference pit may also serve the function of a servo pit, and similarly the synchronization pit may serve the function of a reference pit. Accordingly, the presence or absence of the synchronization pit, reference pit and servo pit may be appropriately determined as desired.

In the present example, the data pit 4 for recording data is a modulation pit including a modulation area. The start and end positions of the pit are modulated in accordance with the data recorded, so that the pit length varies. As shown, the basic structure according to this technique comprises a plurality of data pits 4 arranged in each track at predetermined periods. It should be noted, however, that since the length of each end of the data pit is modulated, the position of the center of mass, so to speak, of each data pit changes depending on the degree of modulation at either end. Thus the data pits are not in reality arranged at completely uniform periods. Therefore, the periods in the present example will be referred to as substantially uniform intervals. By arranging the individual tracks one by one in the radius direction 7 of the optical disc, the pits are two-dimensionally arranged on the disc. In this example, the modulation pits are arranged in a checkered pattern, as shown in FIG. 2, so that they have mutually opposite phases between adjacent tracks.

The length of each end of the data pit 4 (modulation pit edge 6) is varied depending on the data recorded. Code data is recorded by elongating or shortening the pit length with reference to a non-modulated pit length. The point at which an independent item of information is placed, that is the point which is modulated by the recording data, is called a modulation point. Thus, in the present example where the two pit edges on either side of each pit are independently (irrelevantly) modulated, each pit has two modulation points. Although the pits are arranged in a checkered pattern, the pit edges, that is the modulation points 50, are arranged in a regular grid pattern, as indicated by the hatched areas in FIG. 3. The following description will refer to both way so of looking at the pattern.

As the pit pattern is scanned by a beam spot 5 focused by a lens for signal reproduction, the amount of reflected light varies depending on the area of pit portions that are located within the beam spot. The depth of each pit is adjusted during the formation of the optical disc such the phase of reflected light is inverted where pits exist. As the beam spot 5 passes over the pit pattern as shown in FIG. 2A, the reflected light from the pit portions where the phase is inverted and the reflected light from other portions with no phase inversion cancel each other, thus creating a reflected-light intensity profile shown in FIG. 2B. This reflected-light intensity profile constitutes the RF signal, which is herein referred to as a readout signal as is conventionally done. The readout signal shown in FIG. 2B is also called an eye pattern in which readout signals of the data pits 4, when their start and end positions are variously modulated, are superposed.

In the present technique, two or three pits are located within a single beam spot, so that a total of four modulation pit edges 6 are included in the spot. Thus, the sum of the length of each of these modulation pit edges appear in the readout signal when the beam spot is located at SP1 (modulation data sampling point) as shown in FIG. 4. By sampling the intensity of the readout signal at the position of FIG. 4, the value of the sum of the data recorded in each pit can be obtained. When the lengths of three modulation pit edges are known (known-level edges 52), the length of the remaining pit A (unknown-level edge 51) can be determined on the basis of the value of the sum of the data at the four modulation pit edges. Thus, the unknown-level edge 51 can be turned into a known-level edge 52. Further, as the beam spot moves into a new position SP2 (modulation data sampling point), as shown in FIG. 5, since the length of the modulation pit edge A is already known, the length of the remaining pit edge B can be determined. By repeating this process, the length of all of the modulation pit edges in each track can be known. By repeating the same process from one track to another, the digital data recorded in all of the data pits two-dimensionally can be restored. This is how the signal reproduction method in the two-dimensional PRML system is carried out.

As described above, there is an ongoing effort to increase the recording density of optical discs by narrowing the mark pitch and/or the track pitch. However, as the mark pitch is narrowed, another problem has been identified, which relates to interference between symbols. This problem, called inter-symbol interference, will be hereafter described by referring to FIGS. 6 and 7.

As the mark pitch and/or track pitch is narrowed and consequently the pattern is made denser for the purpose of increasing the recording density, edges of adjoining marks come into the field of view of the single beam spot, as shown in FIG. 6. As a result, leakage light from the surrounding mark edges are mixed in, creating an error in the readout signal. This mixing of leakage light is the inter-symbol interference. When the leakage light is produced not only within the track that is scanned but also from the adjoining tracks on both sides, this is called a two-dimensional inter-symbol interference, because the interference is taking place both radially and circumferentially on the disc.

FIG. 7 shows calculated magnitudes of the two-dimensional inter-symbol interference caused by the mixing of leakage light in an optical disc adapted for the two-dimensional PRML technology. In the calculation, the limit value of an error in the readout signal caused by inter-symbol interference which exceeds one level of the multi-value recording is determined, so that the number of recording bits that can be recorded at one modulation point and the recording density per square inch can be determined. The calculation method for FIG. 7 will be described below.

FIG. 7 plots the magnitude (=y) of inter-symbol interference mixing from the surrounding mark edges (modulation points) in logarithm (with a multiplier of 2 to the power of minus x) on the right vertical axis and the recording density on the left vertical axis, against different recording intervals (horizontal axis) in the case of the example of FIG. 6 where one half of mark pitch is set to be equal to track pitch (recording interval) and equal recording intervals are provided. The beam spot has a Gaussian profile with a diameter of 390 nm, on the assumption that blue light (wavelength $\lambda=405$ nm) is focused with a lens having a numerical aperture (NA) of 0.85. The beam spot size (diameter) is herein defined as $\phi=0.82\lambda/NA$. The values on the right vertical axis are logarithms (LOG) to the base 2 of the ratio of the total amount of light mixing from 12 surrounding modulation points, to the four modulation points (mark edge modulation areas). At point zero of the right vertical axis, the total amount of the mixed light is so great as to equal the modulated amount of light at a single modulation point (mark edge). At point 3 on the right vertical axis, the total amount of mixed light from the surrounding modulation points (mark edges) is one eighth (two to the power of minus three) the modulated amount of light at one modulation point (mark edge). When the total amount of mixed light due to inter-symbol interference is one-eighth the modulated amount, multi-value recording of maximum eight levels can be performed at a single modulation point. Namely, in this case, three bits (log 8=3) of information can be recorded per modulation point.

The values on the left vertical axis are obtained by multiplying the values on the right vertical axis with the modulation point density (the modulation point interval raised to the power of minus two). Thus, the left vertical axis indicates the limit of recording density at which reproduction is possible without compensating inter-symbol interference.

In the current optical disc technology, multi-value recording of up to 64 levels (two raised to the $6^{th}$ power) per modulation point is the limit. This is due to limitations in controllability of the film thickness of the recording film or in the precision with which the mark is formed, which creates errors. Accordingly, it is calculated that values in the neighborhood of 32 gigabits per square inch are the limit of recording density attainable by the current two-dimensional PRML system when the two-dimensional inter-symbol interference is not compensated, unless some measures are taken, such as shortening the wavelength of the light source used for reading the disc, or in the method of focusing light or compensation. Thus, the light mixing in from the surrounding marks due to the effect of inter-symbol interference creates errors in the readout signal, thereby limiting the recording density during reproduction with a certain beam spot.

That was the problem of recording density caused by inter-symbol interference. In the following, the problem of how to deal with the noise during reproduction created by inter-symbol interference will be described.

There are many factors during the manufacture and reproduction of the optical disc medium adapted for the two-dimensional PRML system which causes errors in the readout signal. These factors include errors in the pattern recorded on the medium, deformation of the pattern during transcription by stamping (mass reproduction), variation in the film thickness of the plastic cover layer formed on the recording layer, and distortion in refractive index. Pattern errors include an overall displacement of the positions of the pits formed as marks between adjoining tracks, and errors in width or height of the pits. These are production errors in the media. In a reproducing apparatus, when the medium is scanned by a beam spot for reproduction, there are errors such as tracking error, focusing error and tilting of the optical axis in the optical system.

These multiple factors produce mainly two types of fluctuations in the readout signal, namely deviations in medium frequency range which undulate slowly at periods of more than several tens of times of the mark pitch, and deviations in high frequency range which are produced at periods identical to the mark pitch.

The deviations in high frequency range are observed in the form of an AC component in which the signal moves up and down alternately at sampling points. The major causes of this include overall discrepancies of the marks between adjoining tracks that are introduced during the manufacture of the medium, and tracking error in the optical system during reproduction. For example, FIG. 25 illustrates the vertical vibration of the readout signal caused by an overall displacement of the marks between adjoining tracks on the medium. When the positions of the marks between the adjacent tracks are aligned as shown in FIG. 25A, the readout signal produces a pattern in which the eyes are opened at the same height at each sampling timing. But when the positions of the marks between the adjacent tracks are misaligned, as shown in FIG. 25B, the readout signal swings in the form of sine wave in which the eyes move up and down alternately at each sampling timing. This is due to the fact that the marks are concentrated on one side at mark-pitch periods. Similar effects are observed when the beam spot is displaced away from the center of the two tracks toward one of the tracks, creating regular deviations in high frequency range.

On the other hand, the deviations in medium frequency range are observed in the form of a DC component of the readout signal slowly changing. Most of the causes other than the causes for the deviations in high frequency range can be causes for this deviations in medium frequency range. Further, deviation factors such as deviations in refractive index, which used to be typically found in a frequency range an order of magnitude lower, have come to be translated into the mid-frequency range as a result of the reduction in the cover-layer thickness from 0.6 mm to 0.1 mm. Thus, the problem of deviation noise is compounded by additional factors that come into play as a result of increasing the recording density.

Of these problems, the deviations in medium frequency range can be compensated by using a filter for tracking and compensating the DC component fluctuations. However, the method based on the detection of the passing of a compensation pattern, which is often used in the prior art, requires many reference patterns to be placed within the pattern on the medium. In this conventional example, in order not to adversely affect the recording density, each frame (sector) typically contains one or two such compensation patterns, and compensation is made at long periods (low frequency) with intervals of more than 100 marks. Thus, this conventional technique is hardly capable of carrying out effective compensation with regard to error (noise) components having periods shorter than a single frame.

Hereafter the deviations in high frequency range will be described. As mentioned above, there are two major factors contributing to this type of deviations.

The deviations in high frequency range caused by an overall misalignment of the marks between adjoining tracks appears in the readout signal as if substantially only a sinusoidal wave component has been added, without changes in the signal intensity ratio between the two tracks that are simultaneously scanned. This phenomenon is reported in Technical Report MR99-76, IEICE (Institute of Electronics, Information and Communication Engineers), as a mixing of the carrier signal caused by misalignment of the pit edge position. The report states that the mixing can be removed by using a filter (carrier canceller) for removing a signal appearing at carrier periods (carrier signal) that is constantly included in the readout signal. This conventional compensation method employing a carrier canceller requires averaging over a relatively long time, because the method carries out tracking compensation by detecting the carrier signal constantly included in the readout signal separately from the original symbol modulation signal. Consequently, there was the problem that the compensation cannot track the overall positional misalignment of the pits, which fluctuates at relatively short periods of eight frames or less, thus failing to provide sufficient compensative effects.

At the same time, the deviations in high frequency range caused by tracking error during reproduction appears in the readout signal, with the signal from only one of the simultaneously scanned tracks emphasized. In this case, not only is the sinusoidal component of the same frequency as in the case of the misalignment between adjoining tracks added, but also different modulation ratios of the symbols in the individual tracks appear in the readout signal. As a result, the readout signal cannot be decoded accurately by the conventional method of using the carrier canceller, which subtracts the sinusoidal component.

To these error factors is further added the signal error caused by the two-dimensional inter-symbol interference, so that the filter response time necessary for eliminating the carrier signal becomes even longer, thus limiting the noise frequency range that can be compensated.

Another method of compensating the two-dimensional inter-symbol interference runs an equalizer filter on the readout signal after reproduction. This method, however, has the disadvantage that the noises due to the various factors mentioned above are also enhanced when the signal at a high region is enhanced.

Thus, in a high-recording density optical disc in which pits are arranged at smaller intervals than the beam spot, in order to further increase the recording density and allow the information to be reproduced at high reliability, the problems of limited recording density due to the two-dimensional inter-symbol interference have to be solved and means must be provided for responding to the manufacturing error of those optical disc medium and the control error during reproduction as fast as possible and compensating them accurately. It is, therefore, desired to provide an optical disc capable of playing back information highly reliably and an inexpensive optical disc apparatus capable of recording a great amount of information at high density.

Hereafter, the term "marks" will be used instead of "pits" that are used on the ROM (read-only memory) optical disc so far described in the present section. This is in order to include the optical discs in which information is recorded based on changes in the characteristics (such as the crystalline structure and refraction index) of the substance formed by writing, such as the RAM (random access memory) media. Correspondingly, the length between the center of the mark to its mark edge will be referred to as "mark edge length" instead of "the length of the modulation pit edge." Modulating the length of the pit edge in accordance with the recorded information, which corresponds to modulating the area of the mark edge of a modulation point by shifting the mark edge position, will be referred to as "modulating the mark edge length."

In the checkered mark arrangement, since the lengths of the left-half and right-half of the mark are independently modulated, the mark edge lengths are different on the left-side and right-side of the mark. This is defined in FIG. 12. The center (of gravity) of a non-modulated mark is designated as a mark center 90. The interval between the centers of any two adjacent non-modulated marks is designated as a mark pitch 91 along the tracks (circumferential direction) and a track pitch 92 radially.

The length between the mark center 90 and the edges of a mark is designated as a left-side mark edge length 93 on the left-hand side and as a right-side mark edge length 94 on the right-hand side. When the left- and right-side mark edge lengths are mentioned as a whole, they will be designated simply as the mark edge length.

The four edges including any two mark edges adjoining each other along the radius and any two mark edges adjoining each other along the tracks (including the edges on opposite sides of the same mark) are designated as adjacent mark edges.

SUMMARY OF THE INVENTION

To solve the above-described problems, the amount of two-dimensional inter-symbol interference that is caused when playing back the medium is estimated and its compensation is carried out on a pattern recorded on the medium. Because some patterns produce non-linear inter-symbol interference, a pattern is adopted which does not produce such non-linear inter-symbol interference, so that the recording density can be further increased. Accordingly, by utilizing the optical characteristics of the readout signal reproduced from the medium in which the two-dimensional inter-symbol interference is compensated, noise components contained in the readout signal that are of higher frequencies than are found in the prior art can be eliminated without requiring a learning pattern, thus accurate information decoding can be realized. As a means of such compensation, a filter is used which compensates by tracking the misalignment of the eye centers in an eye pattern of the readout signal. Such filters can be provided in two individual lines and switched alternately each time a modulation point is passed. In this way, the number of types of noise that can be dealt with can be increased.

By effecting the inter-symbol interference compensation two-dimensionally, not only the mark intervals along the tracks (circumferential direction) but also along the track intervals (radial direction) can be reduced, so that the recording density can be further increased. The two-dimensional inter-symbol interference compensation can furthermore eliminate the influence of adjacent tracks and makes it possible to obtain an accurate readout signal level. This enables accurate compensation by eye-center tracking, and the compensation becomes more effective as a result of combination (with two-dimensional inter-symbol interference compensation). The influence from the adjacent tracks can be compensated by two lines of tracking compensation filters operating alternately, whereby the signal mixing in by a misalignment between adjacent tracks can be eliminated, thus compensating the noise that is typically created when scanning a plurality of tracks with a single beam spot simultaneously.

In one aspect, the invention provides an information recording medium in which a plurality of marks are arranged along tracks, the mark edge lengths of the marks being modulated by information, wherein the mark edge lengths have a negative symbol correlation between mark edges that are adjacent along the tracks and mark edges that are adjacent across the tracks. In this information recording medium, the mark edge positions are adjusted by two-dimensional inter-symbol interference compensation, so that the recorded information can be reproduced, with the two-dimensional inter-symbol interference compensated, which arises when reproducing the information by using a reproducing beam of light with a spot diameter larger than the interval between marks both in the radial direction of the disc and along the tracks.

The multiple marks may be arranged (in a checkered pattern) such that they have substantially opposite phases between adjacent tracks, and mark edge lengths on either side may be modulated with multi-value levels. The multiple marks may be elliptically shaped and may be arranged along a plurality of lines that extend across the tracks at uniform intervals, such that they are horizontally symmetrical with respect to each line. Each of the plurality of marks may have its mark edge length modulated with three or more multiple values.

In another aspect, the invention provides a method of playing back an optical disc in which a plurality of marks are arranged along the tracks, the mark edge lengths of the multiple marks being modulated with information, the method employing a beam spot having a diameter which is larger than the intervals of the marks both along the radius of the disc and the tracks, the method comprising the steps of:

generating an analog readout signal by detecting readout light reflected by the optical disc;

generating a sampling signal by detecting a synchronization signal from the analog readout signal;

sampling the analog readout signal with the sampling signal;

converting the analog readout signal sampled with the sampling signal into a quantized signal;

outputting a quantized error signal which is the difference between the analog readout signal and the quantized signal; and compensating the analog readout signal with the quantized error signal.

This method can be effectively employed for playing back an optical disc in which the mark edge lengths of the marks have a negative symbol correlation between mark edges that are adjacent along the tracks and mark edges that are adjacent across the tracks.

The compensation may be performed by subtracting the quantized error signal that has been passed through an integral filter from the analog readout signal. When playing back a medium in which the modulation marks are arranged alternately in a checkered pattern, the compensation of the analog readout signal by the output of the quantized error signal and the quantized error signal may preferably be performed individually for an odd-numbered sampling signal and an even-numbered sampling signal.

In yet another aspect, the invention provides an information reproducing apparatus comprising:

an irradiation optical system for irradiating an optical disc with a readout light beam;

an optical head having a detection optical system for detecting readout light beam reflected by the optical disc;

means for detecting a synchronization signal from a readout signal produced by the optical head and generating a sampling signal;

a sampling means for sampling the readout signal in accordance with the sampling signal;

a quantization filter for converting the readout signal sampled by the sampling means into a quantized signal, and outputting the difference between the readout signal that is received and the quantized signal; and a compensation means for compensating the readout signal that is fed to the quantization filter by using the quantization error signal.

This information reproducing apparatus may advantageously be employed for playing back an optical disc comprising a plurality of marks arranged along tracks, the mark edge lengths of the marks being modulated with information, wherein the mark edge lengths have a negative symbol correlation between mark edges that are adjacent along the tracks and mark edges that are adjacent across the tracks, wherein the readout light beam has a spot diameter which is larger than the intervals of the marks both along the radius of the disc and along the tracks.

The compensation means may comprise an integral filter and a subtractor for subtracting the output of the integral filter from the readout signal that is fed to the quantization filter. The information reproducing apparatus may comprise two sets of the quantization filter and the compensation means, one set of the quantization filter and compensation means being adapted to process a readout signal sampled by an odd-numbered sampling signal, the other set of the quantization filter and compensation means being adapted to process a readout signal sampled by an even-numbered sampling signal.

The information reproducing apparatus may advantageously be employed for playing back an optical disc comprising a plurality of marks arranged along the tracks such that the marks have substantially opposite phases between adjacent tracks, the mark edge lengths of the marks being modulated with information at multi-values, wherein the mark edge lengths have a negative symbol correlation between mark edges that are adjacent along the tracks and mark edges that are adjacent across the tracks, wherein the readout light beam has a spot diameter which is larger than the intervals of the marks both along the radius of the disc and along the tracks.

BRIEF DESCRIPTION OF THE DRAWINGS

FIG. 11 shows examples of an eye pattern after two-dimensional inter-symbol interference compensation (A) and an eye pattern from a non-compensated pattern (B). Both (A) and (B) are obtained by simulating readout signal.

FIG. 12 illustrates a method of defining a mark center, a mark pitch, a track pitch, and a mark edge length.

DETAILED DESCRIPTION OF PREFERRED EMBODIMENTS

Figure 1:
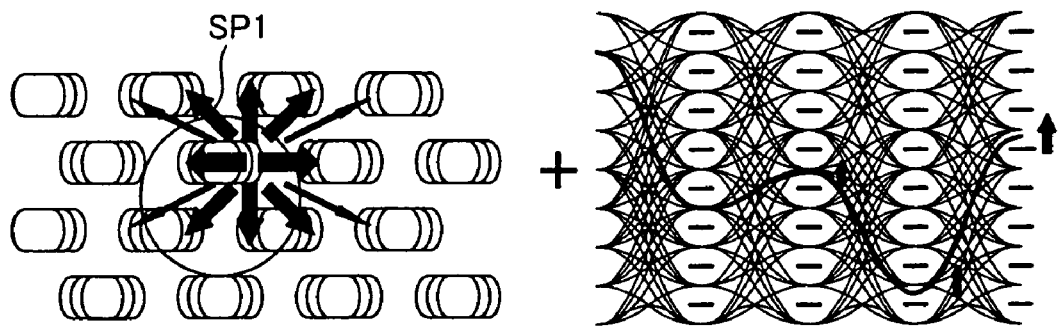
FIG. 1 shows an example of compensation of two-dimensional inter-symbol interference during recording in combination with an example of tracking compensation during reproduction according to the invention.
Figure 2A:
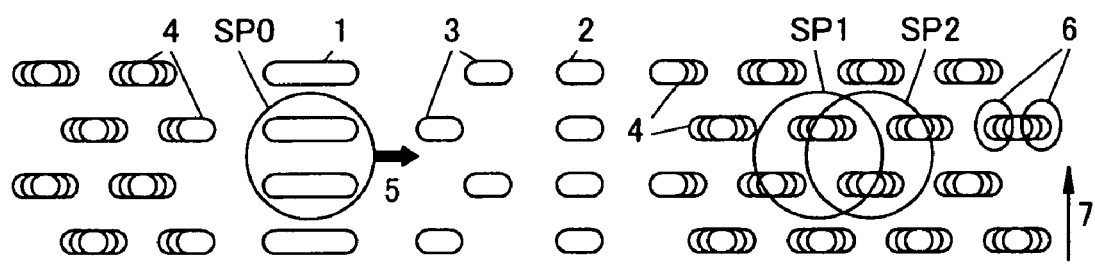
FIG. 2 shows an example of pit arrangement in a conventional pattern and a corresponding readout signal profile.
Figure 2B:
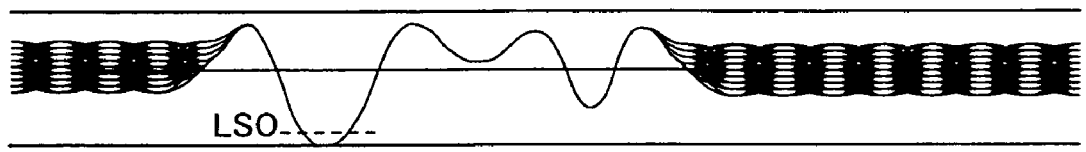

The invention will be hereafter described by way of embodiments with reference made to FIGS. 1, 8 to 24. FIG. 1 illustrates the concept of two-dimensional inter-symbol interference compensation during recording in association with the tracking compensation during reproduction according to the invention. The details of the compensation will be described later. For ease of understanding, elements with similar functions to those of FIGS. 2 to 5 showing a conventional example are designated with similar numerals throughout the subsequent drawings.

Method of Compensating Two-Dimensional Inter-Symbol Interference

A pattern on the medium provided with two-dimensional inter-symbol interference compensation according to the invention will be described by referring to FIGS. 8–12. The inter-symbol interference compensation will also be designated as an ISI (inter-symbol interference) compensation.

In the two-dimensional inter-symbol interference compensation process, the amount of leakage light mixing in from 12 modulation points surrounding four modulation points will be considered a unit of compensation. Thus, a method of compensating in units of modulation points shown in FIG. 3 will be considered.

The distribution of light beam spot is represented by a distribution of 4×4 coefficients. The four central coefficients are located at the center of the beam (=intensity 1). The intensities of the coefficients surrounding the four central coefficients are represented by $k_x$, $k_y$, and $p(<1)$.

| p | $k_y$ | $k_y$ | p |
|---|---|---|---|
| $k_x$ | 1 | 1 | $k_x$ |
| $k_x$ | 1 | 1 | $k_x$ |
| p | $k_y$ | $k_y$ | p |

Next, the amount of modulation after compensation of the mark at each modulation point is represented by a distribution of 5×5 coefficients.

| f | $e_y$ | $d_y$ | $e_y$ | f |
|---|---|---|---|---|
| $e_x$ | c | $b_y$ | c | $e_x$ |
| $d_x$ | $b_x$ | 1 + a | $b_x$ | $d_x$ |
| $e_x$ | c | $b_y$ | c | $e_x$ |
| f | $e_y$ | $d_y$ | $e_y$ | f |

Figure 8:
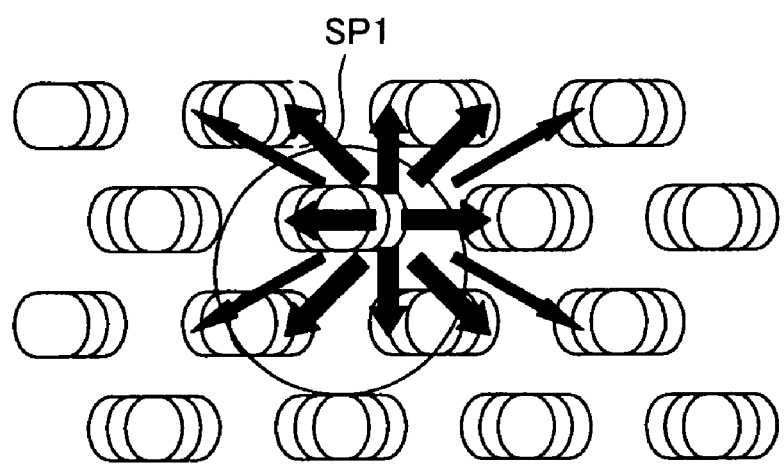
FIG. 8 illustrates the concept of the method of compensating two-dimensional inter-symbol interference according to the invention.

The 1+a at the center is a modulation point to be compensated. Ideally, when this central modulation point is modulated by an amount of modulation=1, this signal is detected as a one-level signal in the readout signal. To obtain such a readout signal, the pattern formed on the disc original is recorded with changes corresponding to the coefficients of a to f, so that the two-dimensional inter-symbol interference can be compensated. Namely, in accordance with this method of compensating inter-symbol interference, the modulated amounts of surrounding modulation points are adjusted depending on the modulated amount of a specific modulation point, as shown in FIG. 8.

In the above example, the coefficients a to f in the case of performing two-dimensional inter-symbol interference compensation in a close-to-ideal situation can be calculated by the following inverse matrix.

$$\begin{pmatrix} 1+a \\ b_x \\ b_y \\ c \\ d_x \\ d_y \\ e_x \\ e_y \\ f \end{pmatrix} = \begin{pmatrix} 1 & 1+k_x & 1+k_y & 1+k_x+k_y+p & k_x & k_y & k_x+p & k_y+p & p \\ k_y & k_y+p & 1 & 1+k_x & p & 1 & k_x & 1+k_x & k_x \\ k_x & 1 & k_x+p & 1+k_y & 1 & p & 1+k_y & k_y & k_y \\ p & k_y & k_x & 1 & k_y & k_x & 1 & 1 & 1 \\ 0 & 0 & k_y & k_y+p & 0 & 1 & p & 1+k_x & k_x \\ 0 & 0 & p & k_y & 0 & k_x & k_y & 1 & 1 \\ 0 & p & 0 & k_x & k_y & 0 & 1 & k_x & 1 \\ 0 & k_x & 0 & k_x+p & 1 & 0 & 1+k_y & p & k_y \\ 0 & 0 & 0 & p & 0 & 0 & k_y & k_x & 1 \end{pmatrix}^{-1} \begin{pmatrix} 1 \\ 0 \\ 0 \\ 0 \\ 0 \\ 0 \\ 0 \\ 0 \\ 0 \end{pmatrix}$$

This matricial equation is obtained under the condition that a change of one level is obtained in the readout signal only when the beam spot is incident on the modulation point at the center.

Assuming a Gaussian beam profile, when the light intensity distribution in an area surrounding the beam spot can be approximated as:

$k_x=0.2300$
$k_y=0.1286$
$p=0.0296$, the coefficients a to f for performing the two-dimensional inter-symbol interference compensation with regard to this beam spot can be determined by solving the above inverse matrix equation as follows:

$$\begin{pmatrix} 1+a \\ b_x \\ b_y \\ c \\ d_x \\ d_y \\ e_x \\ e_y \\ f \end{pmatrix} = \begin{pmatrix} 1.844 \\ -0.549 \\ -0.271 \\ 0.079 \\ 0.126 \\ 0.035 \\ -0.018 \\ -0.010 \\ 0.002 \end{pmatrix}$$

Specifically, when the modulation point at the center is to be recorded with information with a mark edge longer by one level, the mark edge is elongated further by about 84% (=a) during recording, while reducing the length of each modulation point to the left and right by about 55% (=$b_x$). In this manner, the length (mark edge length) of each of the total 25 modulation points (a to f) can be adjusted according to the individual coefficients.

Figure 9A:
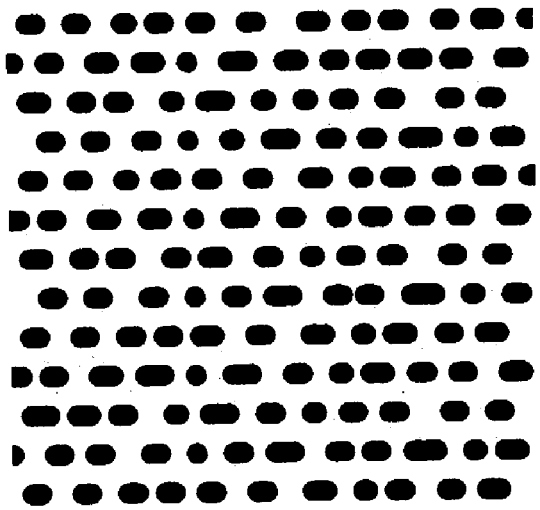
FIG. 9 shows examples of a pattern after two-dimensional inter-symbol interference compensation (A) and a pattern before the compensation (B) in the two-dimensional PRML system.
Figure 9B:
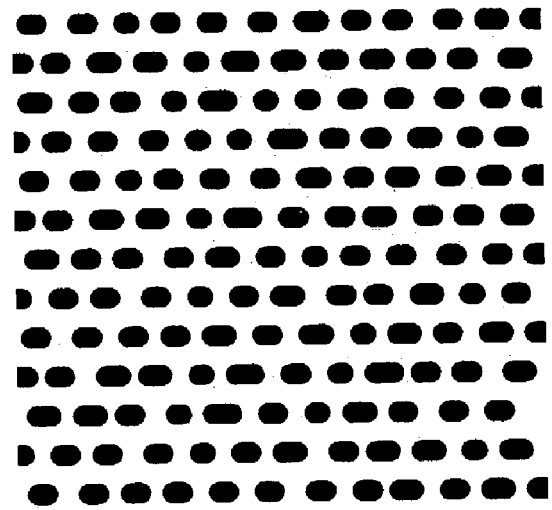

FIG. 9A shows an example of a pattern on a medium after two-dimensional inter-symbol interference compensation. FIG. 9B shows an example of a pattern before compensation on an optical disc adapted for a three-value modulated, two-dimensional PRML technique. As shown, the pattern of FIG. 9A after compensation has somewhat emphasized modulation.

Thus, when compensating the two-dimensional inter-symbol interference in this manner, in order to contain the error within 1%, the length of each of the recording marks in five tracks must be simultaneously adjusted (though this depends on the setting of the track intervals), while taking into consideration the mutual influence among the marks.

Even if the margin of error is somewhat greater at 5% or less, it is still necessary to adjust the length of each recording mark in at least three tracks simultaneously while taking into consideration of mutual influence of the marks. In an arrangement using a FIFO (first-in, first-out) memory for one track disclosed in JP Patent Publication (Nonexamined Application) No. 11-353652, the two-dimensional inter-symbol interference cannot in operation be accurately compensated. It must be noted that a FIFO memory for at least two tracks is necessary.

The mark edge length after performing the above-described inter-symbol interference compensation will be hereafter referred to as a post-compensation mark edge length. On the other hand, the quantized mark edge length before compensation will be referred to as a fundamental modulation mark edge length. Originally, the process of quantizing the individual mark edge lengths into individually identifiable lengths (+1, 0, −1, for example) and then recording them is called coding. However, intermediate mark edge lengths (such as 1.4 and −0.55) will also be referred to as symbols with decimal components.

Figure 10A:
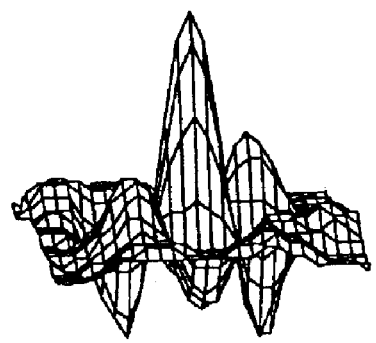
FIG. 10 shows two-dimensional correlation distribution charts created by subjecting the mark edge lengths of each mark in the pattern of FIG. 9 to two-dimensional correlation distribution analysis all over the plane.
Figure 10B:
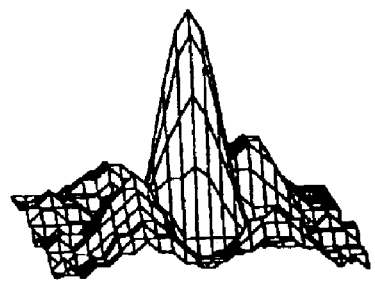

Based on the pattern of FIGS. 9A and 9B, it is also possible to conversely determine the distribution of the 5×5 coefficients from 1+a to f. FIGS. 10A and 10B show charts created by calculating two-dimensional correlation distribution among the individual modulation points, based on the mark edge length of each modulation point which is determined based on the pattern of FIGS. 9A and 9B, and then determining the mean values of the distribution in each pattern as a whole.

The correlation distribution herein refers to the numerical representation of the relative lengths, on average, of mark edges lying adjacent or adjacent but one to each other in the extending pattern of marks. For example, when there is a tendency that when a mark has a long mark edge length, the mark edge length of its adjacent modulation point is also long, these adjacent mark edge lengths are said to have a positive symbol correlation. Conversely, when there is another tendency that when a mark has a long mark edge length, the mark edge length of an adjacent modulation point is, on average, short, these adjacent mark edges are said to have a negative symbol correlation.

Figure 3:
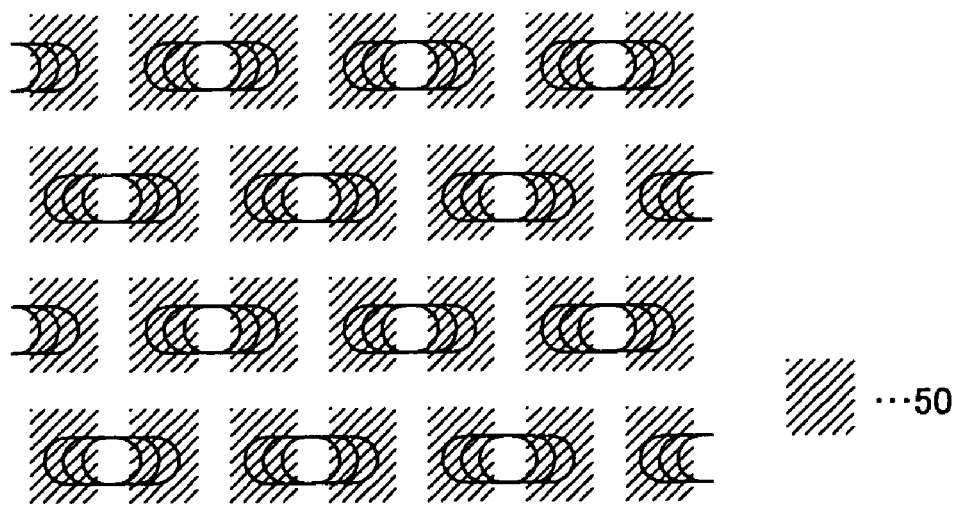
FIG. 3 shows mark edges, when considered as modulation points, arranged in a grid pattern.
Figure 4:
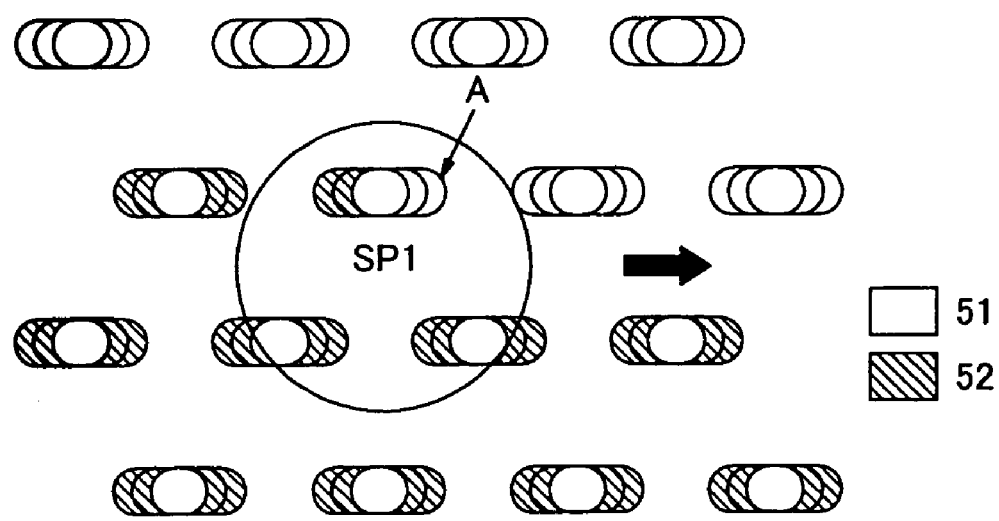
FIG. 4 illustrates how the data sequence recorded in a pit edge is restored based on the sum signal of the lengths of the pit edges appearing in a readout signal according to the two-dimensional PRML technique (step 1).
Figure 5:
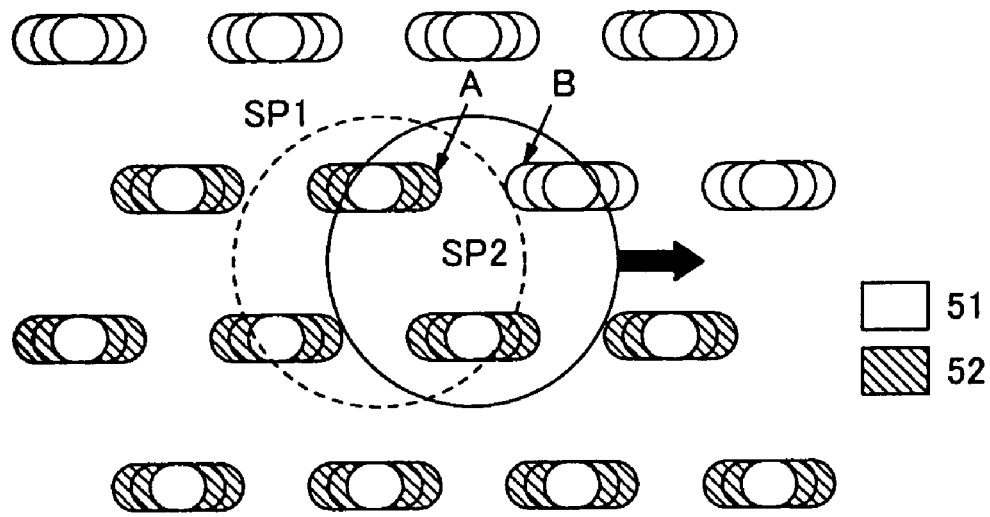
FIG. 5 illustrates how the data sequence recorded in a pit edge is restored based on the sum signal of the lengths of the pit edges appearing in a readout signal according to the two-dimensional PRML technique (step 2).
Figure 6:
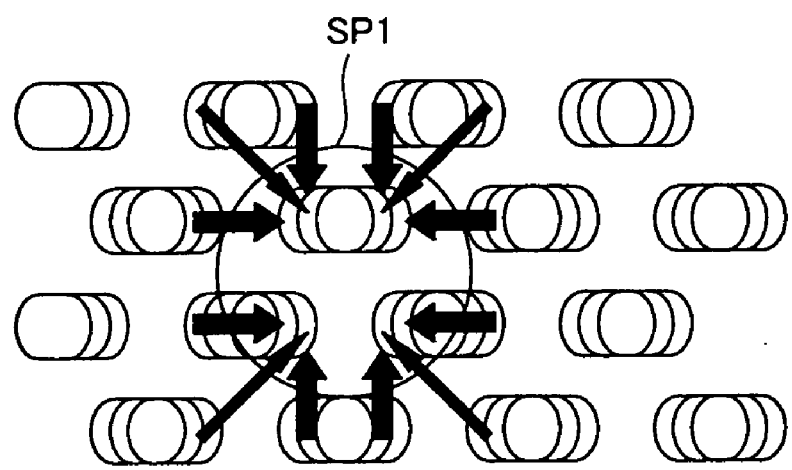
FIG. 6 illustrates how light leaking from the surrounding pits is mixed in (two-dimensional inter-symbol interference) in the two-dimensional PRML technique.
Figure 7:
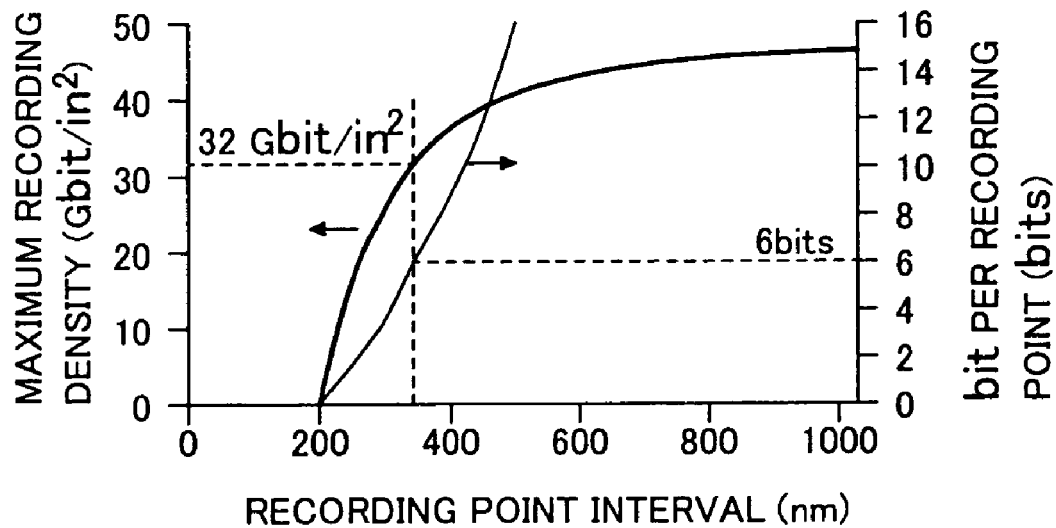
FIG. 7 shows calculated values of the signal mixing rate of two-dimensional inter-symbol interference (right vertical axis), and the upper limit of recording density (left vertical axis) estimated on the basis of the interference rate, in the two-dimensional PRML system.

This correlation calculation is carried out as follows. The area of the mark at each modulation point in FIG. 3 is extracted from the pattern (or a photograph of the pattern, for example). Specifically, the area of each of the hatched mark edges is measured for every modulation point. At all of these modulation points, the relative lengths of the mark edge lengths between adjacent or adjacent but one mark edges are multiplied, whereby the correlations in terms of mark edge lengths are numerically represented and then averaged.

When the area of a mark edge at a modulation point in line i and column j (i, j) is $S_{i,j}$, the correlation value (correlation coefficient) $C(x, y)$ can be determined by the following equation:

$$C(x, y) = \frac{\left(\sum_{i=-\infty}^{\infty}\sum_{j=-\infty}^{\infty} 1\right)\left(\sum_{i=-\infty}^{\infty}\sum_{j=-\infty}^{\infty} S_{i,j} \cdot S_{i+x,j+y}\right) - \left(\sum_{i=-\infty}^{\infty}\sum_{j=-\infty}^{\infty} S_{i,j}\right)^2}{\left(\sum_{i=-\infty}^{\infty}\sum_{j=-\infty}^{\infty} 1\right)\left(\sum_{i=-\infty}^{\infty}\sum_{j=-\infty}^{\infty} (S_{i,j})^2\right) - \left(\sum_{i=-\infty}^{\infty}\sum_{j=-\infty}^{\infty} S_{i,j}\right)^2}$$

FIGS. 10A and 10B show the results of plotting the correlation coefficient C (x, y) in the height direction, with x and y plotted on the two axes.

The upward projection at the center is the correlation value of the modulation point itself, and it therefore has a height (correlation factor) of one at all times. This correlation value becomes zero at infinity due to loss of correlation. Thus, the absolute value of the axis can be known based on the height of the central projection (1) and that at infinity (0). In FIG. 10A, there are four downward projections surrounding the central projection, the height of each downward projection corresponding to the coefficient $b_x$ (horizontally adjacent) and $b_y$ (vertically adjacent). Similarly, in this distribution, the sizes of the projections roughly correspond to the distribution of the 5×5 coefficients of 1+a to f two-dimensionally. In FIG. 10B where no two-dimensional inter-symbol interference compensation is performed, there is no downward projections, so that it can be seen that there is no such two-dimensional correlations of the individual mark edge lengths as in the distribution of 5×5 coefficients.

Thus, when there is a pattern with more than a certain area in which the recorded modulation data can be regarded as random, it can be determined whether or not the pattern is provided with two-dimensional inter-symbol interference compensation by analyzing the correlation distribution characteristics of the pattern mark edge lengths.

When the optical disc recorded with such a pattern is reproduced on a reproducing apparatus and scanned by a beam spot of a predetermined diameter, the two-dimensional inter-symbol interference is cancelled and a readout signal with correctly separated multi-value levels can be obtained. FIG. 11 shows an example of such a readout signal.

FIGS. 11A and 11B comparatively show the results of simulating the eye patterns of readout signals (RF signals) that would be obtained when an identical location on patterns created for an identical recording signal sequence was scanned by a beam spot of the same size, FIG. 11A relating to the case of effecting a two-dimensional inter-symbol interference compensation and FIG. 11B relating to the case of not effecting the compensation. It is assumed that the recording density is 40 gigabits per square inch and the beam spot diameter (390 nm) is 1.65 times the mark pitch.

FIG. 11A, in which compensation has been performed, shows white eyes opening at regular intervals on the signal. FIG. 11B, in which no compensation has been performed, shows as if similar eyes are opened. However, in this case, the signals that should have passed through the second and third eyes from bottom are actually passing between the third and fourth eyes. Further, the eyes are not opened correctly, as will be seen from the non-uniform intervals of the white eyes between the upper and lower halves. Thus, the readout signal of FIG. 11B cannot accurately decode the data.

Thus, in an optical disc whose density is increased by narrowing the track pitch and mark pitch, it is absolutely necessary to compensate the two-dimensional inter-symbol interference in order to accurately decode the recorded data.

The presence of downward projections in FIG. 10A indicates that the mark edge length immediately next to a mark with a long mark edge length is conversely short. This is said that "the mark has a negative symbol correlation." The pattern of marks having a negative symbol correlation can be obtained by both inter-symbol interference compensation and a pre-emphasis technique. However, if an optical readout signal is to pass through the center of a target multi-value level that it should pass through when scanning by a beam spot of a predetermined size, a pre-emphasizing process has to be performed using predetermined filter characteristics depending on the size of the spot. Accordingly, the inter-symbol interference compensation may be understood as a special case of pre-emphasis in which the interference among multi-value symbols between marks and tracks are adapted to be cancelled when reproduced using a beam spot with a particular diameter.

In the thus two-dimensional inter-symbol interference-compensated pattern, the mark lengths become non-integers due to the compensation, so that they are not quantized. Instead, when a compensated medium is read by a beam of light with a predetermined spot size, the sampling values of the readout signal (RF signal) are quantized.

In accordance with the method of the invention, as compared with the case of effecting an inter-symbol interference compensation by signal processing (two-dimensional MTF (modulation transfer function) compensation circuit, which is a kind of equalizing compensation) after reproduction, it is not necessary to perform the inter-symbol interference compensation in the reproducing circuit. Thus, the two-dimensional MTF compensation circuit can be dispensed with and therefore the reproducing circuitry can be simplified, thus reducing costs.

In the case of equalizing compensation by the post-reproduction signal processing, the signal component in a high-frequency region is enhanced, which also enhances the noise due to positioning error while drawing or resist roughness and, as a result, the quality of the readout signal is compromised. In contrast, the method of the invention does not require an equalizer, so that the noise is not enhanced. Thus, the invention has the advantage that a more accurate symbol extraction (decoding) can be performed with the same level of drawing accuracy during the production of the pattern.

Apparatus for the Production of a Medium Having a Two-dimensional ISI Compensation Pattern Referring to FIGS. 13 and 14, an apparatus for producing an optical disc having the above-described ISI compensation pattern will be described.

Figure 13:
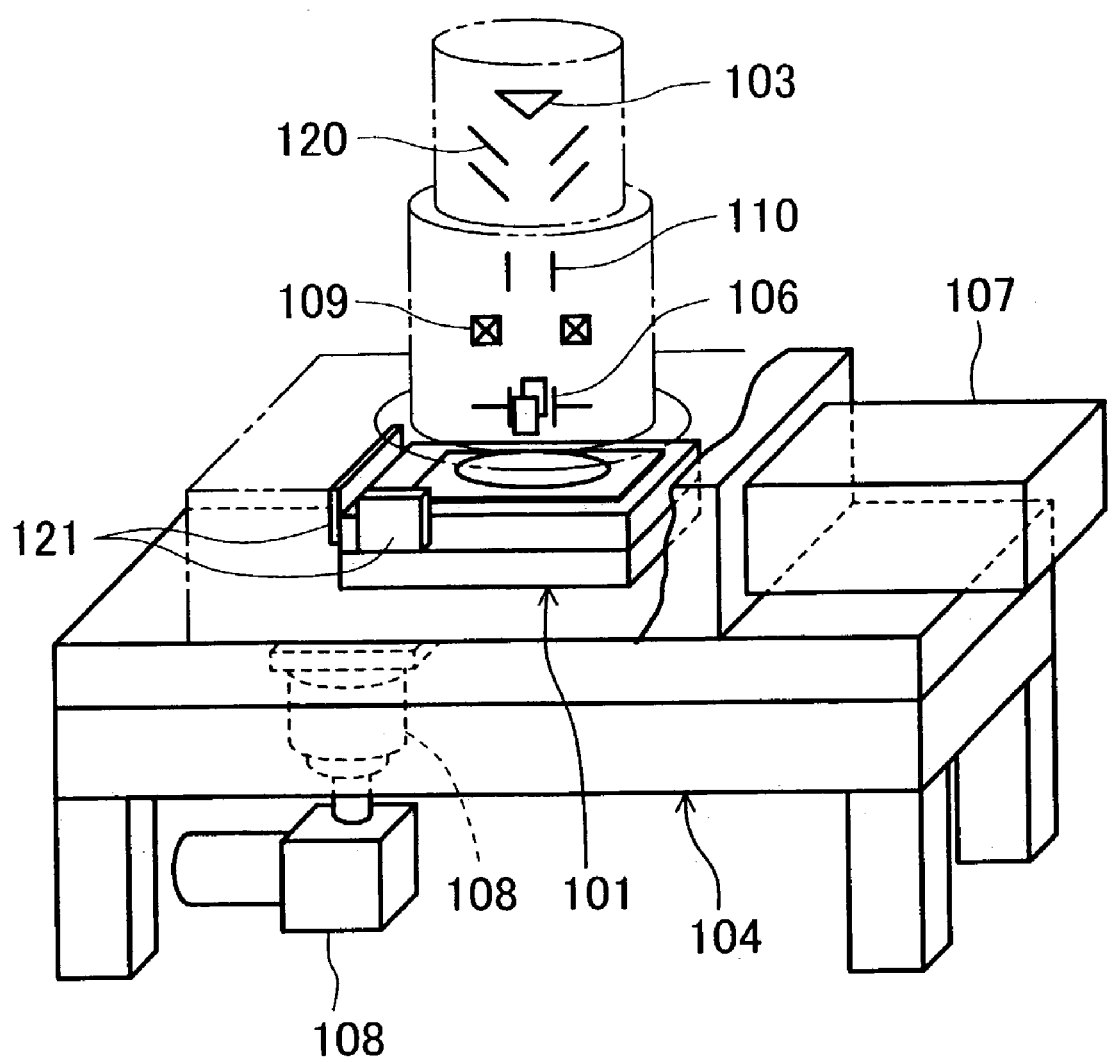
FIG. 13 shows an example of the mechanical system in an information recording apparatus for recording information by performing two-dimensional inter-symbol interference compensation.
Figure 14:
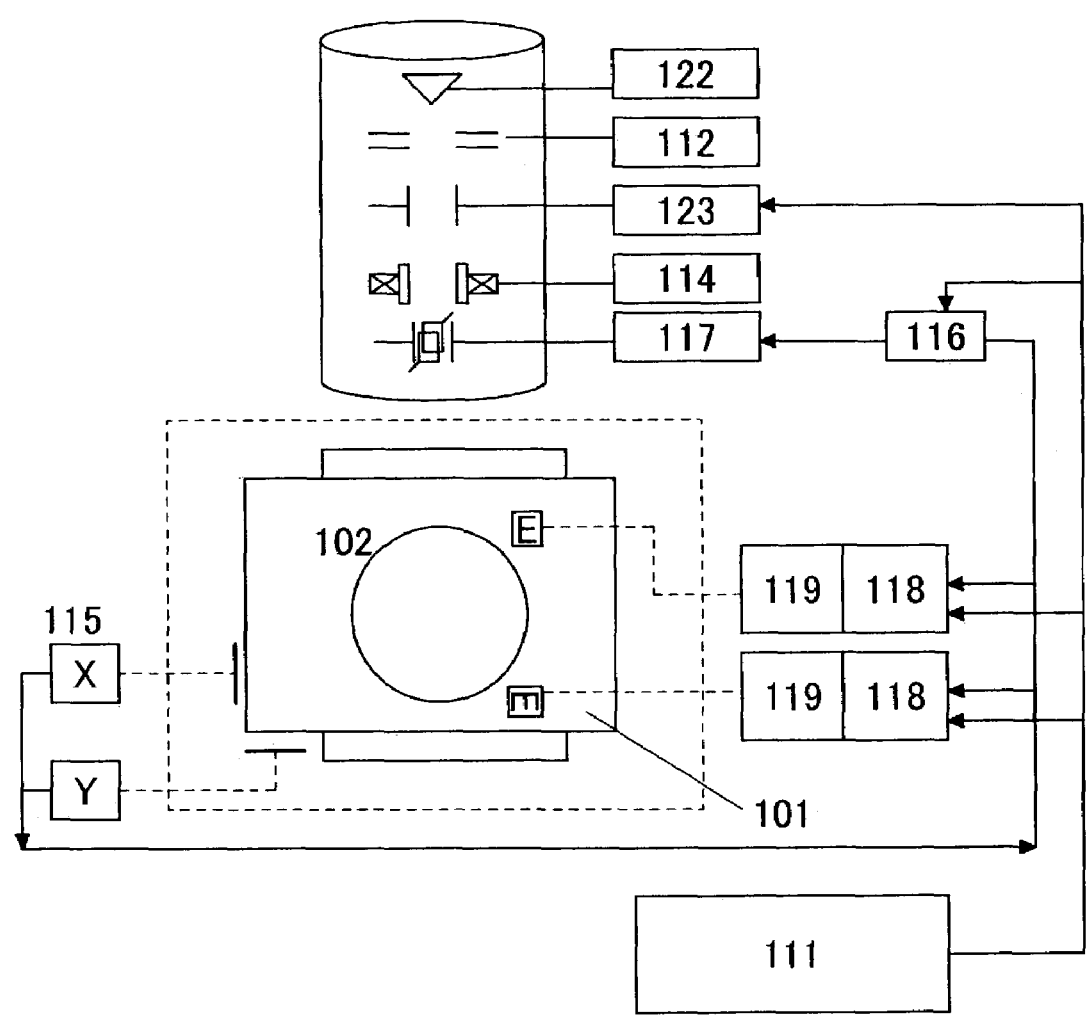
FIG. 14 shows an example of the control system (electrical system) in the information recording apparatus for recording information by performing two-dimensional inter-symbol interference compensation.

FIG. 13 shows an example of the overall mechanical structure of an electron drawing apparatus equipped with a blanking function. An electron-beam gun 103 emits an electron beam against a wafer 102 placed on an XY stage 101 that is disposed in vacuum. A fine pattern is drawn by deflecting and blanking the electron beam. In this example, the wafer is used as the original for the optical disc. It should be noted that FIGS. 13 and 14 show only those portions of the electro-optical system that are highly relevant to the invention.

A vacuum chamber 105 is mounted on an air spring stage 104. A two-dimensionally movable XY stage 101 is accommodated in the vacuum chamber. An electron-beam gun 103 is mounted on the ceiling portion of the vacuum chamber. The electron-beam gun 103 emits an electron beam which is accelerated by a high voltage applied to an accelerating electrode 120 before impinging on the wafer 102 mounted on the XY stage 101. Electrostatic deflection electrodes 106 are disposed between the electron-beam gun 103 and the wafer 102. By applying a voltage across the electrodes, the trajectory of the electron beam can be bent such that the irradiated position of the electron beam can be scanned. The electrostatic deflection electrode 106 is connected to a high-frequency deflection amplifier and a voltage corresponding to the displacement of the stage is applied thereto. The chamber includes a vacuum pump 108 and a entry lock 107, and the inside of the chamber can be maintained at high vacuum by the pump. The wafer 102, which is the object of drawing, can be introduced into the vacuum from the atmosphere via the entry lock 107 sandwiched by two gates and be placed on the XY stage 101. The wafer 102 on the XY stage 101 is irradiated with the electron beam emitted by the electron-beam gun 103. By applying a voltage across blanking electrodes 110, the irradiation of the electron beam can be switched on and off, thereby drawing a pattern. The position where the electron beam impinges can be controlled by both a main deflector 109 and the electrostatic deflection electrode 106. The main deflector, which is slower, is used for deflecting the beam over a large area.

Next referring to FIG. 14, an example of the structure of the signal system of the electron drawing apparatus according to the invention will be described. The control system comprises a control unit for an electron optical system (including the electron-beam gun) called a column, an XY-stage drive control/position detection system, and a draw controller 111 controlling the drawing of the pattern. The electron optical system is controlled in the same way as in the conventional scanning electron microscope. The electron-beam gun 103 is heated by an electron-beam gun power supply 122 and the electron beam emitted by the electron-beam gun 103 is accelerated by an application voltage from an accelerating voltage supply 112. The focus of the electron beam is adjusted by a voltage supplied from a main focusing-coil signal amplifier 114.

The XY stage 101 includes reflectors 121 whose positions are measured by a laser interferometer 115 to detect control error. The control error is fed forward to the electrostatic deflection electrode via a deflection gain adjuster 116 and the high-frequency deflection amplifier 117, so that the precision on the pattern that is drawn can be compensated. The XY stage has its X- and Y-axes individually controlled by motor drivers 119 via feedback PID control circuits 118.

Prior to drawing, the amount of compensation of the two-dimensional inter-symbol interference that will occur on the pattern is calculated in advance in the draw controller 111, and the on/off timing in the drawing of marks is compensated in advance and stored as pattern data. The draw controller 111 is actually an interface-equipped computer that is capable of sending data at a high rate in synchronism with the control system as a whole. The draw controller can perform matrix calculations for compensating two-dimensional inter-symbol interference. While it is necessary to generate the post-compensation pattern by taking into consideration the data for the three tracks before and after the compensating track (total of five tracks), the data for the post-compensation pattern can be generated relatively easily by the calculation indicated in the matrix calculations, because all the digital data to be recorded is known prior to drawing. The wafer 102, that is the original, is coated with an electron beam resist (ZEP-520, for example) to a thickness of from 50 to 100 nm prior to drawing. The XY stage 101 is reciprocally moved in individual directions by a sine wave and a cosine wave such that a circular movement of the wafer 102 is initiated. Then, a desired mark pattern is drawn on the wafer by controlling the voltage applied via a blanking amplifier 123 across the blanking electrodes 110 in accordance with the stored on/off data.

Thus, in the present original drawing apparatus, the two-dimensional inter-symbol interference compensation of the pattern is performed prior to drawing and stored in the form of digital data in advance.

When the wafer 102 is a glass wafer with a thickness of about 0.6 mm, the wafer 102 on which the pattern has been drawn as described above is developed. By forming a platinum reflective film (about 80 nm) on the resultant resist film pattern, an optical disc medium can be obtained that can be reproduced on a reproducing apparatus. When the wafer 102 is used as an original for transcription and reproduction, the wafer that has been developed is plated with nickel to the thickness of about 1 mm. The wafer is then removed, and the remaining nickel plate is used as an original for making copies by stamping, thus obtaining a desired optical disc medium.

Playback of the Two-Dimensional ISI Compensation Pattern

Figure 15:
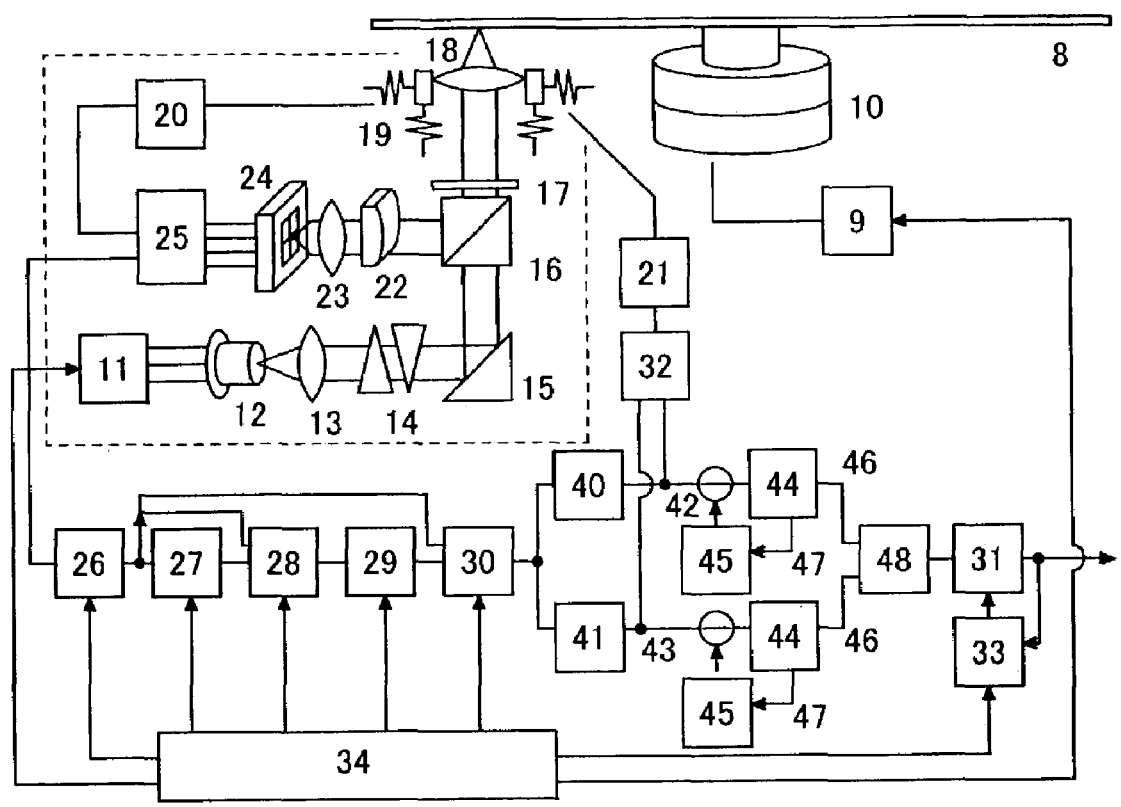
FIG. 15 shows an example of an optical disc reproducing apparatus according to the invention.
Figure 16:
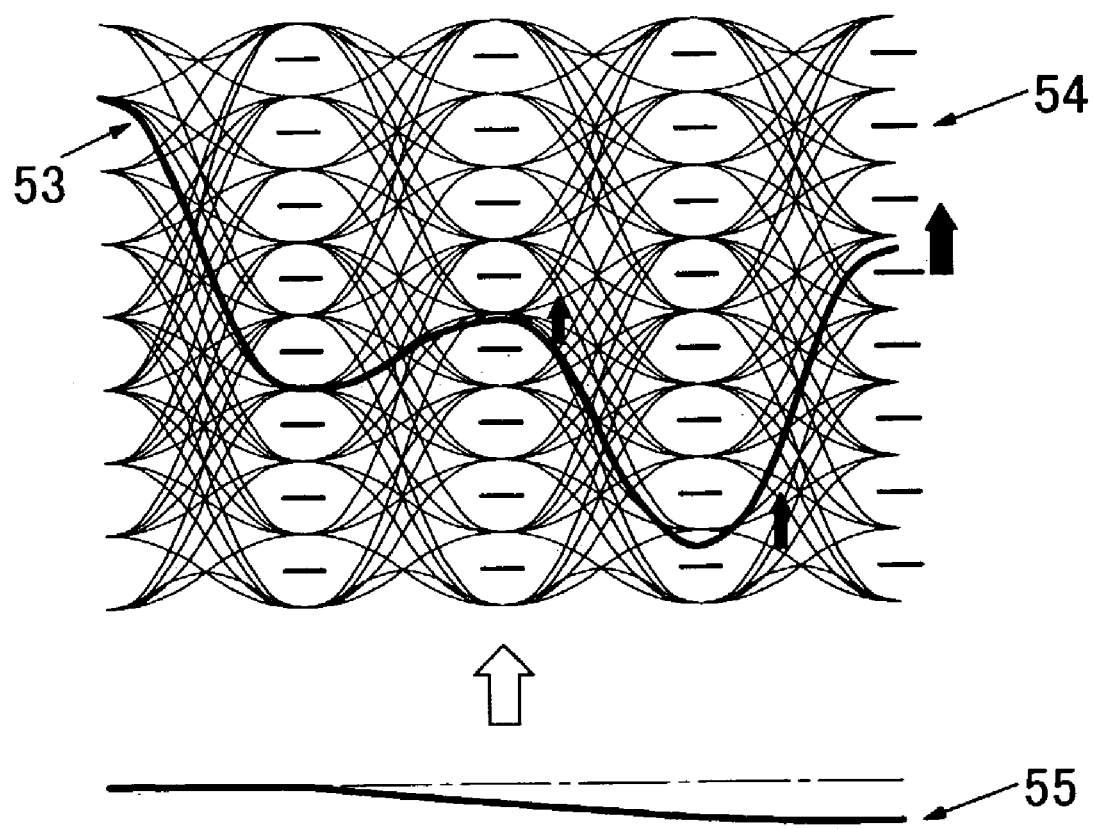
FIG. 16 illustrates how a DC-component signal error is tracked and compensated by the method of compensating a readout signal according to the invention.
Figure 17:
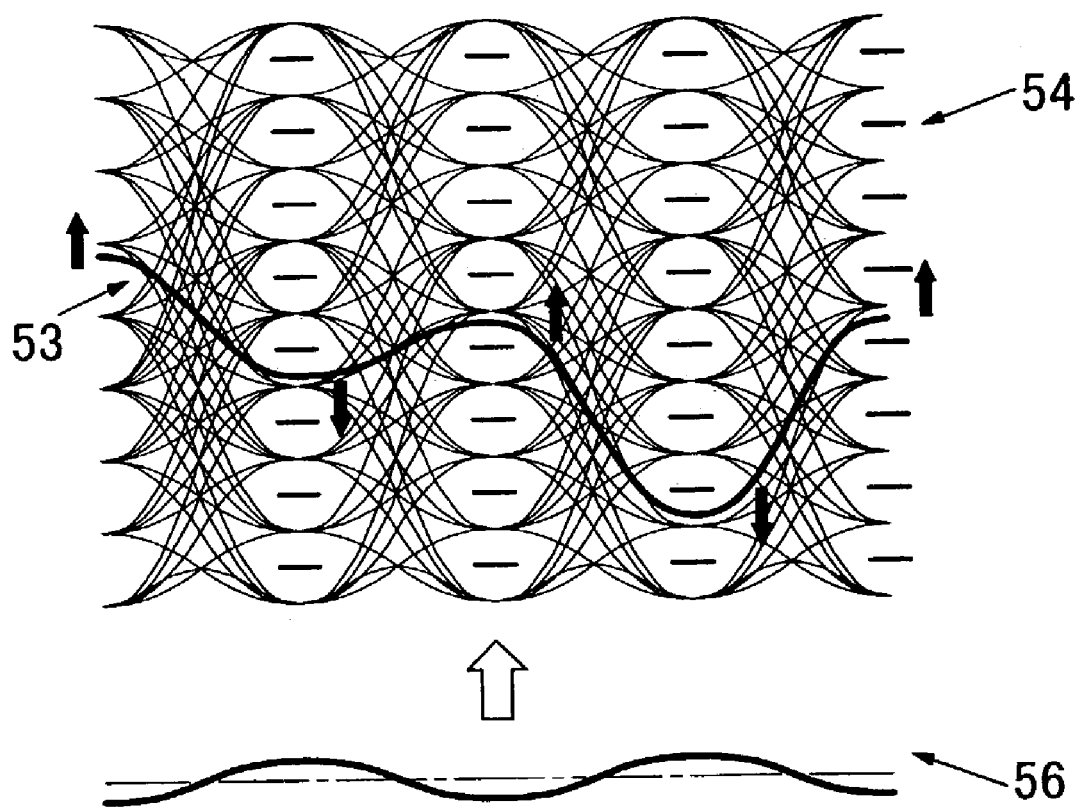
FIG. 17 illustrates how an AC-component signal error is tracked and compensated by the method of compensating a readout signal according to the invention.

Referring to FIGS. 15 to 17, an example of a reproducing apparatus for playing back an information-recording medium on which information is recorded with two-dimensional inter-symbol interference compensation. FIG. 15 shows an example of the optical disc reproducing apparatus according to the invention. FIG. 16 illustrates a tracking compensation process performed on a DC-component signal error. FIG. 17 illustrates a tracking compensation process performed on an AC-component signal error.

An optical disc 8 having a pattern compensated for two-dimensional inter-symbol interference is mounted and rotated on a motor 10 controlled at a constant rotation speed by a rotation servo control circuit 9. A laser beam of light is emitted by a semiconductor laser 12 driven by a laser drive circuit 11. The laser beam of light is collimated by a collimating lens 13 into parallel light and then shaped by a beam-shaping prism 14. The shaped beam of light is reflected by a reflector 15 and introduced toward the optical disc 8. The light passes through a polarizing beam splitter 16 and a quarter wave plate 17, and is then focused on the optical disc 8 by an objective lens 18. The objective lens 18 is disposed on an actuator 19, so that it can be moved both in the direction of focal length and the radius of the disc by an electric signal. The focal depth direction and the disc radius direction are controlled by a focal servo control circuit 20 and a tracking servo control circuit 21, respectively, such that the light can be focused on the pattern on a desired track on the optical disc 8.

Reflected light which is modulated by the pattern on the optical disc 8 is modified back to parallel light as it passes through the objective lens 18. After passing through the quarter wave plate 17, the light is reflected by the polarizing beam splitter 16 and impinges on four quadrant photodetectors 24 via a cylindrical lens 22 and a focusing lens 23. On the four quadrant photodetectors 24, the symmetry of the light pattern changes depending on the focal depth of the objective lens 18. This change can be detected photoelectrically and converted into an electric signal indicating a focusing error, which can be amplified by a photo-current amplifier 25 and fed back to the focus servo control circuit 20, thus realizing an automatic focus control system.

The reflected light signal amplified by the photo-current amplifier 25 is also processed for playing back information. The signal from the photo-current amplifier 25 is first compensated by an equalizer circuit 26 with regard to the frequency and the amount of reflected light. The compensated signal is fed to a level comparator 27, a synchronization pattern detector 28 and a sampling circuit 30. The level comparator 27 detects a mirror-level signal which indicates the head of a synchronization pattern. Specifically, the level comparator 27 retains a maximum value of the readout signal, and based on a comparison with this value, the circuit can detect the mirror level easily and reliably. In response to this signal, the synchronization pattern detector 28 detects a synchronization signal (signal with a synchronization mark) for the readout signal, and generates a synchronization timing signal synchronized with the position of an aligned pattern. This signal is supplied to a phase locked loop circuit 29, which produces a multiplied signal synchronized with the synchronized timing signal. The multiplied signal is fed to a sampling circuit 30 as a sampling clock, which samples the readout signal in synchronism with the passing points of the modulation data.

The sampled readout signal is distributed to an even-point signal sample-and-hold circuit 40 and an odd-point signal sample-and-hold circuit 41 alternately in accordance with the sampling clock. An even-point sampling signal 42 outputted from the even-point signal sample-and-hold circuit 40 and an odd-point sampling signal 43 outputted from the odd-point signal sample-and-hold circuit 41 are input to a quantization filter 44. The quantization filter 44 includes an AGC (automatic gain control) circuit and converts the inputted analog signal into a signal that is quantized (coded) with a gain suitable for a sampling signal sequence.

Figure 26:
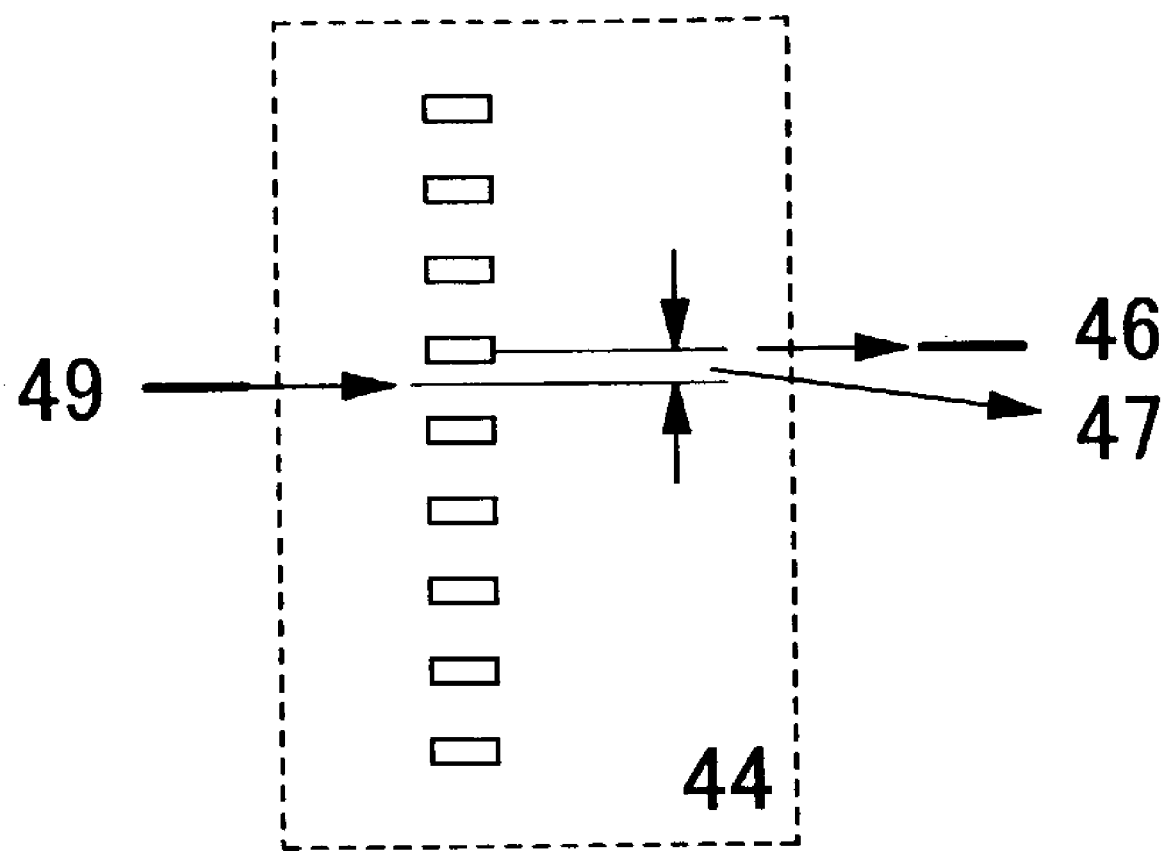
FIG. 26 illustrates a quantum error and how a quantum filter operates.

FIG. 26 illustrates how the quantization filter 44 works. The quantization filter quantizes the analog input signal 49 into a quantized signal 46 having a most approximate quantization level. The difference between the quantized signal 46 and the original input signal 49 is outputted as a quantization error signal 47, which indicates how much the input analog signal is displaced away from an ideal quantized signal (center between each two eyes in the eye pattern).

Now referring back to FIG. 15, the quantization error signal 47 is fed back to the original analog signal via an integral filter 45, so that, as shown in FIG. 16, when the range of the original analog signal is displaced in one direction (upward or downward) as a whole, the displacement can be brought back. The black arrows pointing upward in FIG. 16 figuratively indicate the direction and amounts of compensation. The slow, overall displacement of the readout signal (RF signal) 53 is caused by a deviations 55 in the mid-frequency region, as mentioned in the Background Art section. Numeral 54 in FIG. 16 designates quantization boundary levels.

Because the compensation circuit operates for the even-point sampling signal 42 and the odd-point sampling signal 43 individually, signal displacements such as a sine wave signal displacement shown in FIG. 17 in which the direction of signal displacement is reversed at alternate sampling points can be dealt with. The sine wave of the carrier period causes the readout signal 53 to fluctuate up and down at each sampling point, thus creating noise. Accordingly, the readout signal has to be compensated in a manner that the up-down deviations is tracked in synchronism with the sampling clock. The deviations in which only the amplitude of the sine wave varies slowly at periods of 10 or more sampling points can be dealt with for the upper and lower portions individually, as opposed to the compensation of the upward and downward displacements appearing at each sampling point alternately. The cause of this sinusoidal, alternately fluctuating signal displacements is the deviations 56 in the high-frequency range, as mentioned in the Background Art section. Because the displacement of a since-wave component can be directly detected and compensated at sampling periods, faster tracking compensation can be performed as compared with the case of using the carrier canceller, which slowly extracts the sinusoidal component from the readout signal and then detects and tracks it. The black arrows in FIG. 17 figuratively indicate the directions and amounts of compensation.

By thus dividing the compensation circuit into the two separate lines for the even-point sampling signal and the odd-point sampling signal, not only the DC-component deviations but also AC-component deviations, which could not be red by the conventional multi-value compensation alone, can be compensated.

In the above description, the analog signal that is produced by playing back the medium and which is proportional to the amount of reflected light was referred to as an optical readout signal (RF signal). In contrast, the restoration of digital data by separating multiple values from the readout signal is expressed as extracting the symbols.

The two quantized signals 46 are re-combined into a single symbol sequence signal by a signal mixer 48 and then supplied to a decoding circuit 31. The decoding circuit 31 dissolves a quantized signal corresponding to a sum of the mark edge lengths of each modulation mark into symbol data for each modulation point, based on the signal stored in the memory 33 that has been reproduced one track earlier, thus decoding the bit signal of the track that is read. The thus decoded bit signal is stored in the memory in preparation for the readout of the next-track data.

The even-point sampling signal 42 and odd-point sampling signal 43 supplied to the tracking error signal generator 32 are detected (sampled) when the beam spot passes over a specific pattern for the detection of tracking error. The signals at the edge position, which corresponds to a servo pit and which enables the detection of a tracking error, are extracted. Based on the difference between the two signals, tracking error (tracking error amount) of the beam spot is detected. The tracking error, that is the amount of displacement from the ideal track position, is fed back to the tracking servo circuit 21, so that the light beam can be focused at the right track. The servo circuit, drive circuit, and signal processing circuit are comprehensively controlled by a main control circuit 34.

The data recorded on the disc can be put to use by processing the decoded bit signal outputted by the decoding circuit 31 in a manner suitable for particular purposes. Generally, processes such as an error compensation process and a scramble-demodulating process are carried out.

The present invention provides a disc medium in which a signal-level compensation pattern is provided for each frame (or sector). The medium is compensated for inter-symbol interference such that, each time the compensation pattern is passed over, the readout signal passes a specified one of the multi-value levels, instead of resetting the compensation value. The amount of compensation is detected based on the readout signal (RF signal) at each sampling point. Thus, the carrier signal caused by the positional error in pits between adjacent tracks can be tracked not only during the passing of the compensation pattern but also at each sampling point. This makes it possible to detect and track the amount of periodic signal fluctuations caused by overall positional error of the pits at each sampling point accurately, which has heretofore been tracked over a period corresponding to several frames to several tens of frames. Thus, the periodical signal fluctuations of the carrier period in the two-dimensional PRML system can be eliminated, and the data in the modulation area can be reproduced more accurately and reliably. This allows the limit imposed on the level of precision in drawing during the production of the optical disc medium to be relaxed, which increases the margin of error with regard to the overall pit position error, thereby decreasing the optical disc manufacturing costs. Furthermore, in the apparatus for playing back the optical disc, the margin of error range is increased with respect to the tracking error that causes periodic signal fluctuations in the readout signal substantially in the same manner as does the above-mentioned overall pit position error. Thus, the costs for manufacturing the optical disc reproducing apparatus can also be decreased.

Thus, the optical readout signal is reproduced from the medium which is compensated for two-dimensional inter-symbol interference by applying the quantization filter. The filter tracks the displacement of the eye center by utilizing the opening of the eyes in an eye pattern. In this manner, the readout signal can be correctly decoded without requiring a learning pattern, while at the same time eliminating the noise components of higher frequencies than those of the prior art. Because the method according to the invention does not require the learning pattern, it can increase the recording density. Because the method effects the compensation at each sampling clock timing, the noise margin of error can be significantly improved.

Even in the case of the up-and-down, alternate compensation in synchronism with the sampling clock, the invention enables the sinusoidal component to be tracked faster than is possible with the conventional carrier canceller filter, which detects and tracks the sinusoidal component only slowly. Thus, a combination of the two-dimensional inter-symbol interference compensation method and the method of the invention makes it possible to eliminate the noise of frequencies that are one or two orders of magnitude higher than those in the prior art.

As for the deviations in medium frequency range of the readout signal due to manufacturing error of the medium or control error during reproduction, they can be directly compensated in the readout signal whenever each modulation point is passed, without requiring a compensation pattern or learning pattern to be inserted in the middle of the data recorded portion over and over. Thus, even those error (noise) components that have periods shorter than a single frame can be effectively compensated. For example, it is possible to reproduce a disc medium on which patterns have been drawn including a noise having periods shorter than two or three frames (sectors).

The deviations in high frequency range can be relatively flexibly compensated, because the center value and gain during the multi-value judgment are varied individually in two compensation circuits for both the case where only the sinusoidal component is involved and the case where the signal to noise ratio of two tracks varies.

Medium in which the Inter-Symbol Interference can be Accurately Compensated

An optical disc medium in which the recording density is increased even higher by means of two-dimensional inter-symbol interference compensation will be described by referring to FIGS. 18 to 24.

As mentioned in the Background Art section, JP Patent Publication (Unexamined Application) No. 6-76303 discloses a method of compensating one-dimensional non-linear inter-symbol interference by using a learning pattern. The non-linear inter-symbol interference is an interference that causes the sum of modulation amounts of each mark to have a value in the readout signal that is slightly different from the compensated value, as described in FIG. 12 of the publication. A similar problem arises in the case of two-dimensional inter-symbol interference if the recording density is to be increased by narrowing the interval between modulation points.

Figure 18A:
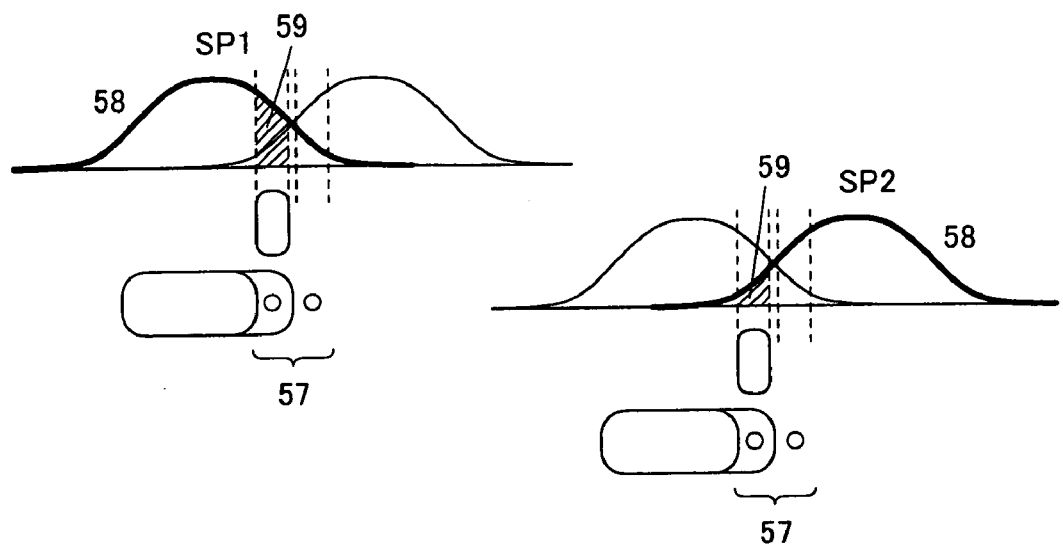
FIG. 18 illustrates an imbalance in light amount obtained from modulation areas caused by differences in sampling positions in an optical disc according to the prior art.
Figure 18B:
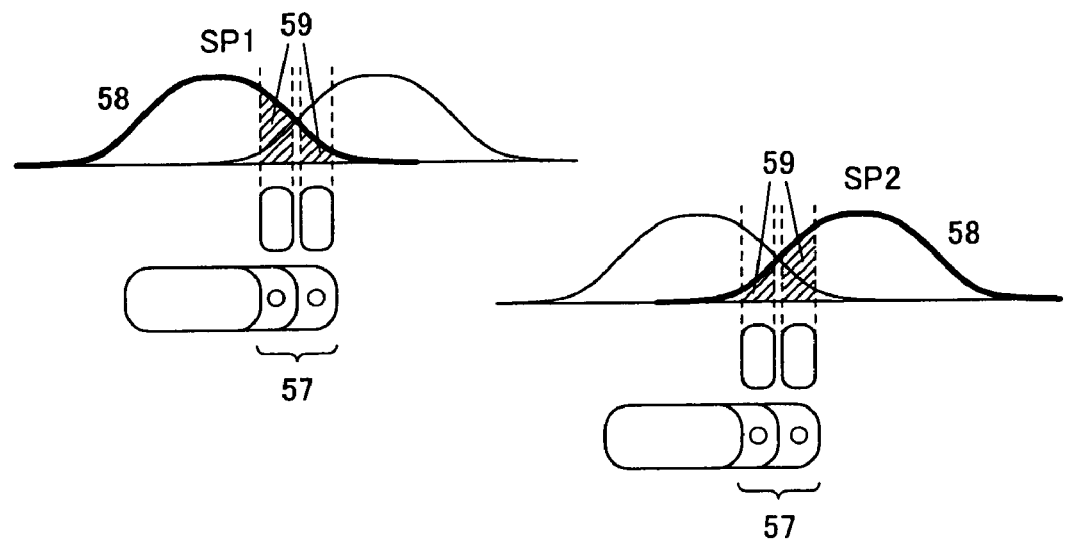

Hereafter, the problem of non-linear inter-symbol interference which is caused in the conventional format, that is the two-dimensional PRML system in which marks are arranged on a checkered pattern. FIG. 18 illustrates the imbalance in the amount of readout light caused by the asymmetry of a mark with respect to a sampling point. A case where a mark edge length is modulated with three different values will be considered. Looking only at a modulation area 57, a middle-length pit produces different amounts of light 59 from its modulation area depending on whether the beam spot is impinging on a left-side sampling point SP1 or a right sampling point SP2, as shown in FIG. 18A. Thus, the sum of the entire amount of reflected light for each of SP1 and SP2 does not appear to be that of the same one step on the readout signal. This imbalance in light amounts does not occur in the cases where, in a three-value modulation, the mark edge length is longest and shortest as shown in FIG. 18B, as the modulation area 57 is symmetric with respect to the positions of beam spot for SP1 and SP2. The imbalance arises only when the mark is asymmetric with respect to the sampling point.

When this phenomenon occurs in the case where more than one mark-edge modulation area is present in one spot, the sum of light-amount errors from the individual modulation areas may exceed one step worth of modulation amount. With an recording density in excess of 45 gigabits, this phenomenon may destruct the eyes in the eye pattern in the readout signal even if a two-dimensional inter-symbol interference compensation is performed, thus making it impossible to decode the recorded information. With regard to this problem, JP Patent Publication (Unexamined Application) No. 6-76303 discloses a compensation method using a learning pattern.

Figure 19:
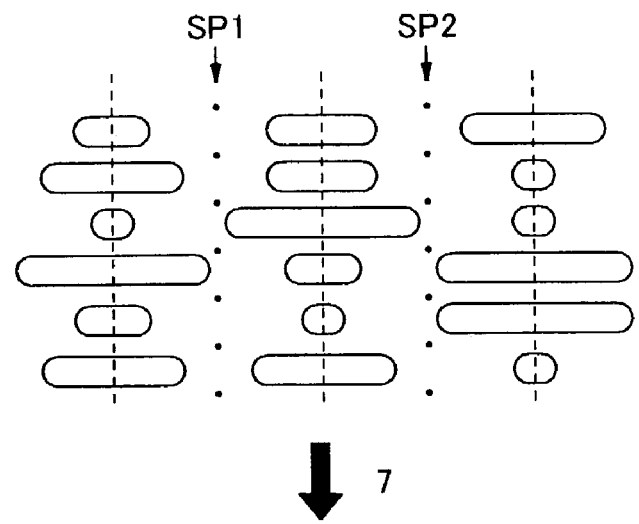
FIG. 19 shows a recording pattern which does not cause imbalance in the amount of light obtained from the modulation areas according to the invention.
Figure 20:
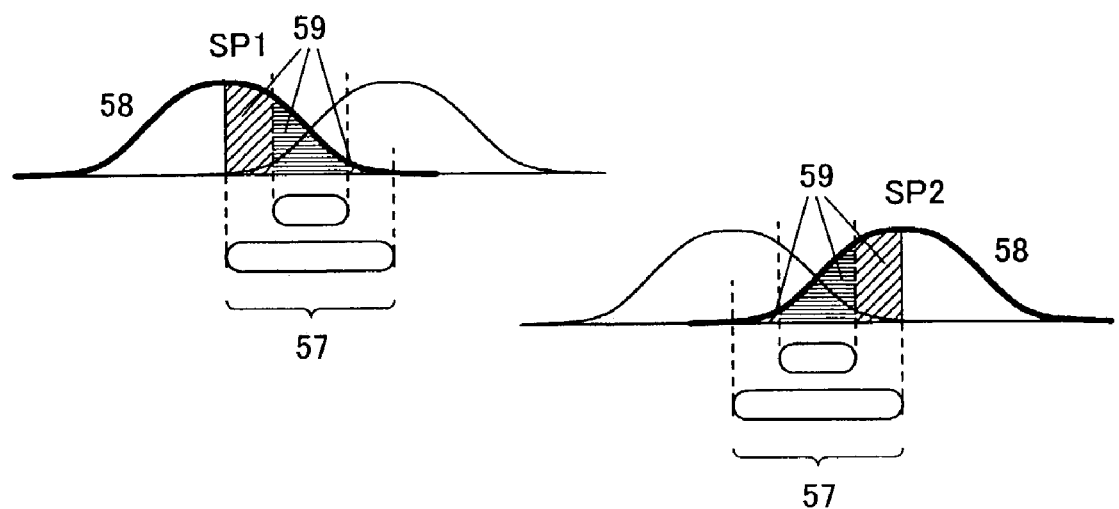
FIG. 20 illustrates the absence of imbalance in the amount of readout light in a symmetric mark pattern of the invention with respect to left-side and right-side sampling points.

This non-linear inter-symbol interference can be suppressed by replacing only those portions corresponding to the modulation areas of the mark with symmetric marks and modulating the left- and right-side edges of the mark symmetrically with respect to the mark center, as shown in FIG. 19. FIG. 20 shows how the light beam impinges on the marks of FIG. 19 when the marks are reproduced. In symmetrical marks, as shown, the amount of readout light that is detected is the same whether the beam spot is at a left-side sampling point SP1 or a right-side sampling point SP2, regardless of whether the mark is a long one or a short one. Accordingly, any numbers of multi-values can be recorded by continuously modulating the mark length. For example, as many as 10 levels of multi-values can be modulated and decoded, provided that the pattern on the medium has sufficient precision.

Figure 22A:
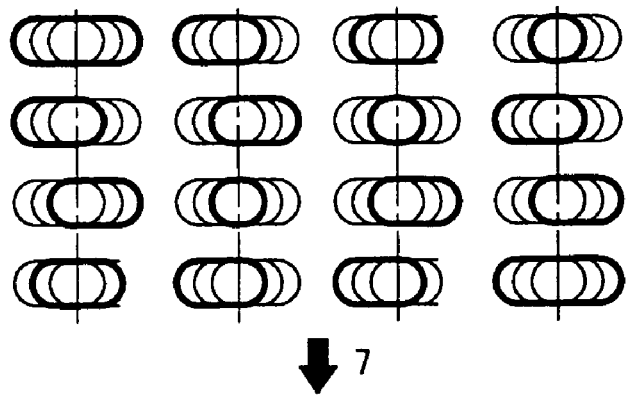
FIG. 22 shows the arrangement of the modulation marks according to the invention in comparison with that of the marks according to a conventional pattern.
Figure 22B:
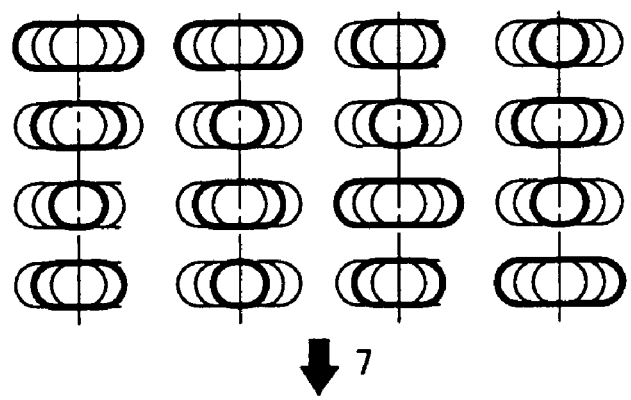
Figure 22C:
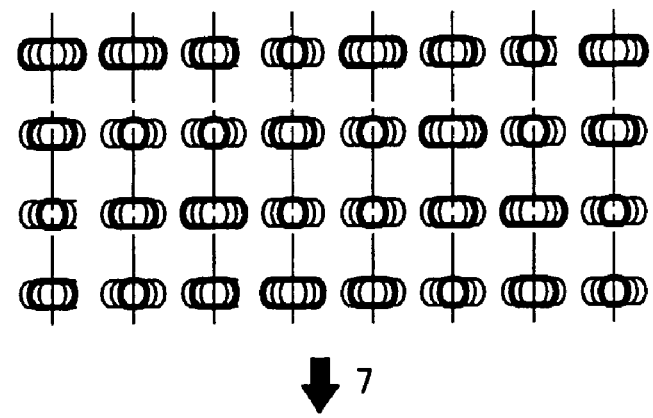

FIG. 22 shows a comparison of this pattern with a conventional optical disc medium disclosed in JP Patent Publication (Nonexamined Application) No. 6-76303, in which the size relationships are disregarded and only shapes are considered. FIG. 22A shows the conventional pattern in which left- and right-side mark edges are independently modulated. FIG. 22B shows the pattern according to the invention, in which mark edges are modulated with symmetrical shapes. FIG. 22C shows a comparison of the marks of the invention with FIG. 22A with an identical scale. In the pattern according to the invention, an independent mark is arranged at each point corresponding to each of the mark edges (modulation points) of FIG. 22A. Each sampling point (SP1, SP2) is located at a vacant point at the center of four of these small marks. In the pattern (FIG. 22C), although each mark can handle one piece of multi-value information, the mark shapes are symmetrical and there is no optical imbalance, so that, theoretically, the two-dimensional inter-symbol interference can be compensated completely.

By using the pattern according to the invention which enables the two-dimensional inter-symbol interference to be compensated accurately, a readout signal with an ideal multi-value level can be obtained. Because the error in the readout signal can be minimized, the number of the multi-value levels that can be recorded can be increased, so that the recording density can be greatly increased.

Figure 23A:
FIG. 23 shows examples of symmetric mark shapes that can be used in the invention.
Figure 23B:
Figure 23C:

The shape of the symmetric marks is not limited to the oval shape that has so far been referred to and shown in FIG. 23A. Other shapes that can be utilized include a rectangle shown in FIG. 23B whose lengths and width are modulated, and a circle shown in FIG. 23C whose diameter is modulated. The rectangular shape can be advantageously formed by a single stroke in an electron-beam drawing apparatus, so that the medium production costs can be reduced. An electron beam, which has a high resolution, can draw fine patterns with a high information recording density.

Figure 24:
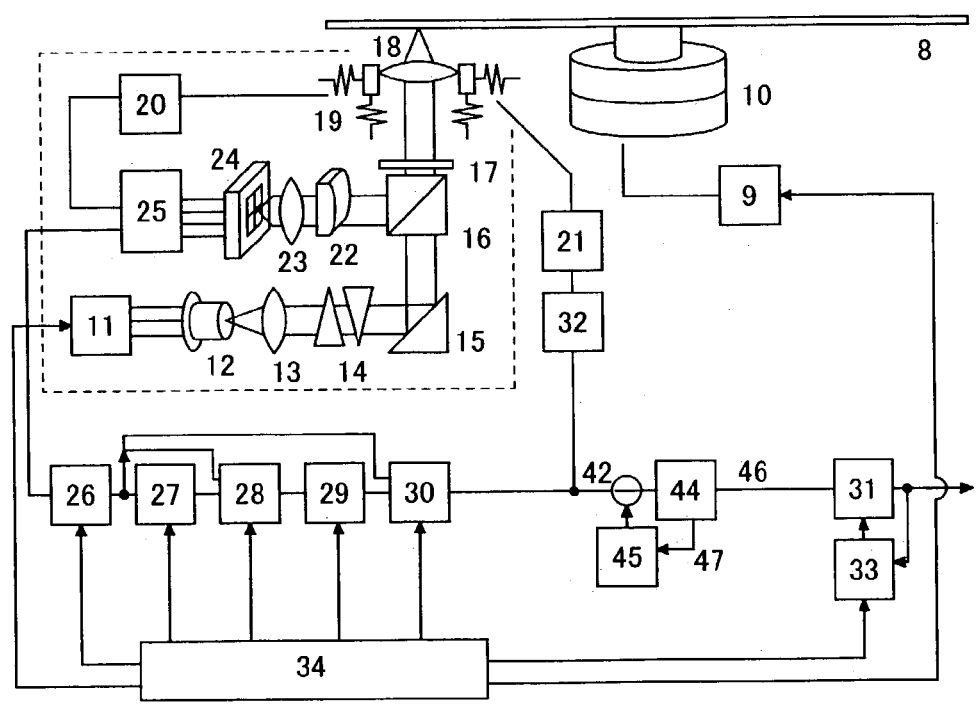
FIG. 24 shows the diagram of an example of the apparatus for playing back an optical disc medium having an axially symmetric mark pattern according to the invention.
Figure 25A:
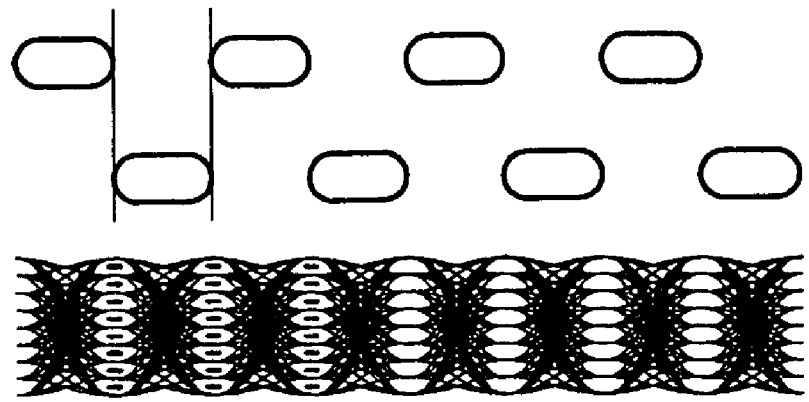
FIG. 25 illustrates how deviations in high-frequency region occurs as a result of a misalignment of pits between adjacent tracks.
Figure 25B:
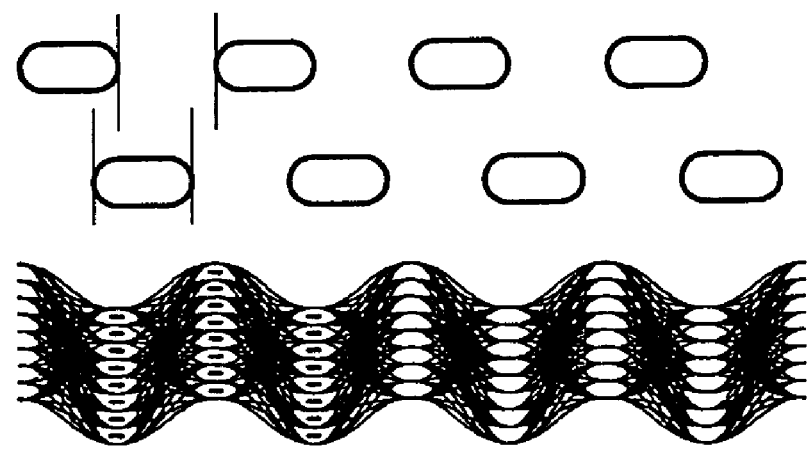

The reproducing apparatus for an optical disc having the pattern according to the invention does not require the two lines of tracking compensation filters, because there is no noise of the carrier frequency which causes the readout signal to fluctuate up and down at each sampling clock timing. Thus, the reproducing apparatus can employ a simpler reproduction circuit by doing away with the even-point signal sample-and-hold circuit 40, odd-point signal sample-and-hold circuit 41 and signal mixer 48, as shown in FIG. 24.

Figure 21:
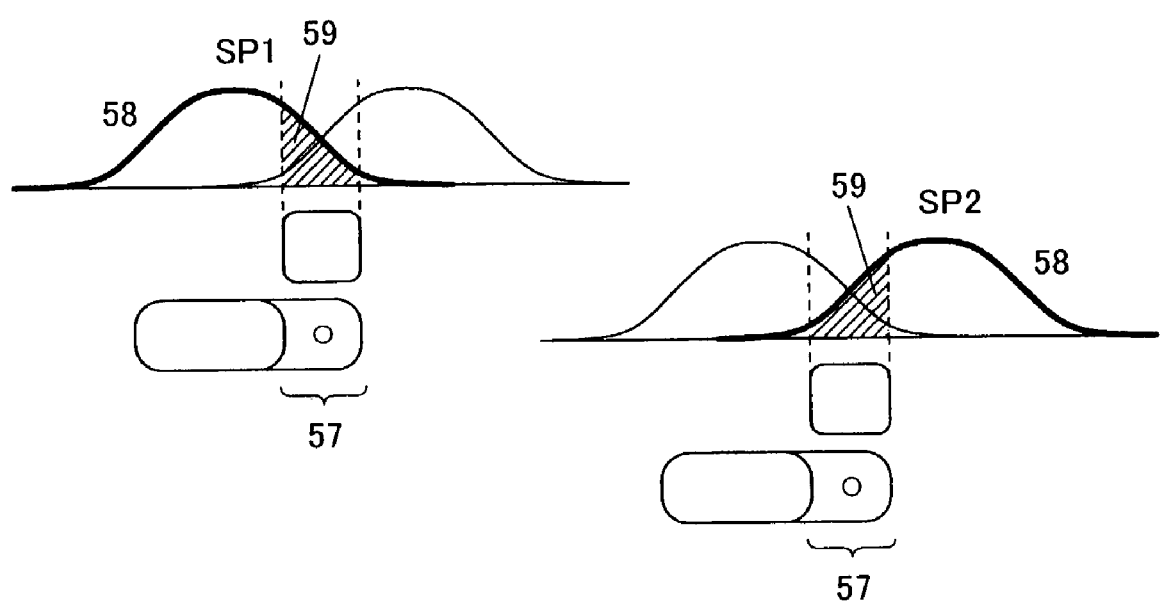
FIG. 21 illustrates the absence of imbalance in the amount of light obtained from modulation areas by properly arranging the manner in which the mark edge lengths are determined during binary modulation in a medium with a checkered-pattern mark arrangement according to the invention.

Furthermore, even in the conventional example where the marks are arranged in a checkered pattern, the pits can be modulated in two ways only, that is either the pit is long or short, and the pits are recorded such that the sum of the mark edge lengths for the two values is equal to the mark pitch, as shown in FIG. 21. In this way, the same amount of light can be obtained whether the light is detected from the left-side sampling point SP1 or right sampling point SP2. Thus, even when the modulated amount in two-value modulation is changed a little bit by inter-symbol interference compensation, the imbalance of light amount caused by the introduction of additional modulated amount can be minimized. As a result, the amount of displacement in the readout signal can be minimized and the readout signal can be stably decoded, so that the information can be correctly reproduced. As the displacement in the readout signal can be minimized, the mark pitch and track pitch can be narrowed and so the recording density can be increased.

Thus, in accordance with the invention, the amount of two-dimensional inter-symbol interference that is caused during reproduction of a medium is estimated and the inter-symbol interference is compensated within the patterns on the medium when the information is recorded. In this way, the two-dimensional inter-symbol interference that is caused by narrowing the mark or track pitch for increasing the recording density of the medium can be compensated. This makes it possible to achieve an recording density of more than 32 gigabits per square inch in a single layer on an optical disc adapted for reproduction by using blue light.

When a medium compensated for the two-dimensional inter-symbol interference is reproduced, the eyes in the eye pattern in the readout signal are opened. Accordingly, the readout signal can be directly compensated by using a filter that tracks and compensates the displacement in the eye center. Thus, the noise contained in the readout signal can be eliminated up to those frequency components that are one or two orders of magnitude higher than the frequencies that can be eliminated by the prior art, in which a learning pattern is inserted into the recorded data. The information can therefore be decoded correctly, and the level of margin of error can be increased for manufacturing errors in the original of the medium or control errors in the reproducing apparatus according to the two-dimensional PRML system.

Furthermore, by providing two lines of filters for tracking the displacement of the eye center so that the compensation filter used can be switched alternately each time a modulation point is passed, the kinds of noise that can be dealt with can be increased. Accordingly, this method can eliminate not only a noise caused by the displacement between adjacent tracks that is introduced during drawing, but also a noise caused by a tracking error during reproduction.

Some patterns may produce non-linear inter-symbol interference. Thus, by using a pattern that does not produce non-linear inter-symbol interference, the recording density can be increased even more.

Thus, by using the two-dimensional inter-symbol interference compensation on the medium and the compensation during reproduction in combination, the margin of error for noise can be increased, the manufacturing cost of the optical disc medium can be reduced, and further a simpler compensation circuit can be adopted. Accordingly, the invention can provide a high recording density, highly reliable optical disc and optical disc apparatus inexpensively.

What is claimed is:

1. An information recording medium in which a plurality of marks are arranged along tracks, the mark edge lengths of the marks being modulated by information, wherein the mark edge lengths have a negative symbol correlation between mark edges that are adjacent along the tracks and mark edges that are adjacent across the tracks, wherein the negative symbol correlation exists when, on average, in a given track, if a particular pit is recorded to have a relatively shorter length then a subsequent pit is recorded to have a relatively longer length.

2. The information recording medium according to claim 1, wherein the plurality of marks are arranged such that they have substantially opposite phases between adjacent tracks, and wherein the mark edge lengths on both sides of each mark are modulated with multiple values.

3. An information recording medium in which a plurality of marks are arranged along tracks, the mark edge lengths of the marks being modulated by information, wherein the mark edge lengths have a negative symbol correlation between mark edges that are adjacent along the tracks and mark edges that are adjacent across the tracks, wherein the plurality of marks are arranged along a plurality of lines that extend across the tracks at uniform intervals, such that they are horizontally symmetrical with respect to each line, and wherein the negative symbol correlation exists when, on average, in a given track, if a particular pit is recorded to have a relatively shorter length then a subsequent pit is recorded to have a relatively longer length.

4. The information recording medium according to claim 3, wherein the marks are substantially elliptical.

5. The information recording medium according to claim 3, wherein each of the plurality of marks has its mark edge length modulated with three or more multiple values.

6. A method of playing back an optical disc in which a plurality of marks are arranged along the tracks, the mark edge lengths of the multiple marks being modulated with information, the method employing readout light beam whose beam spot diameter is larger than the intervals of the marks both along the radius of the disc and the tracks, the method comprising the steps of:

generating an analog readout signal by detecting readout light reflected by the optical disc;

generating a sampling signal by detecting a synchronization signal from the analog readout signal;

sampling the analog readout signal with the sampling signal;

converting the analog readout signal sampled with the sampling signal into a quantized signal;

outputting a quantized error signal which is the difference between the analog readout signal and the quantized signal; and compensating the analog readout signal with the quantized error signal, wherein the mark edge lengths of the marks recorded in the optical disc have a negative symbol correlation between mark edges that are adjacent along the tracks and mark edges that are adjacent across the tracks, and wherein the negative symbol correlation exists when, on average, in a given track, if a particular pit is recorded to have a relatively shorter length then a subsequent pit is recorded to have a relatively longer length.

7. The information reproducing method according to claim 6, wherein the compensation is performed by subtracting the quantized error signal that has been passed through an integral filter from the analog readout signal.

8. A method of playing back an optical disc in which a plurality of marks are arranged along the tracks, the mark edge lengths of the multiple marks being modulated with information, the method employing readout light beam whose beam spot diameter is larger than the intervals of the marks both along the radius of the disc and the tracks, the method comprising the steps of:

generating an analog readout signal by detecting readout light reflected by the optical disc;

generating a sampling signal by detecting a synchronization signal from the analog readout signal;

sampling the analog readout signal with the sampling signal;

converting the analog readout signal sampled with the sampling signal into a quantized signal;

outputting a quantized error signal which is the difference between the analog readout signal and the quantized signal; and compensating the analog readout signal with the quantized error signal, wherein the mark edge lengths of the marks recorded in the optical disc have a negative symbol correlation between mark edges that are adjacent along the tracks and mark edges that are adjacent across the tracks, and wherein the compensation of the analog readout signal by the output of the quantized error signal and the quantized error signal is performed individually for an odd-numbered sampling signal and an even-numbered sampling signal, and wherein the negative symbol correlation exists when, on average, in a given track, if a particular pit is recorded to have a relatively shorter length then a subsequent pit is recorded to have a relatively longer length.

9. An information reproducing apparatus comprising:

an irradiation optical system for irradiating an optical disc with a readout light beam;

an optical head having a detection optical system for detecting a readout light beam reflected by the optical disc;

means for detecting a synchronization signal from a readout signal produced by the optical head and generating a sampling signal;

a sampling means for sampling the readout signal in accordance with the sampling signal;

a quantization filter for converting the readout signal sampled by the sampling means into a quantized signal, and outputting, as a quantization error signal, the difference between the readout signal that is received and the quantized signal; and a compensation means for compensating the readout signal that is fed to the quantization filter by using the quantization error signal, wherein the optical disc comprises a plurality of marks arranged along tracks, the mark edge lengths of the marks being modulated with information, wherein the mark edge lengths have a negative symbol correlation between mark edges that are adjacent along the tracks and mark edges that are adjacent across the tracks, wherein the readout light beam has a spot diameter which is larger than the intervals of the marks both along the radius of the disc and along the tracks, and wherein the negative symbol correlation exists when, on average, in a given track, if a particular pit is recorded to have a relatively shorter length then a subsequent pit is recorded to have a relatively longer length.

10. An information reproducing apparatus comprising:

an irradiation optical system for irradiating an optical disc with a readout light beam;

an optical head having a detection optical system for detecting a readout light beam reflected by the optical disc;

means for detecting a synchronization signal from a readout signal produced by the optical head and generating a sampling signal;

a sampling means for sampling the readout signal in accordance with the sampling signal;

a quantization filter for converting the readout signal sampled by the sampling means into a quantized signal, and outputting, as a quantization error signal, the difference between the readout signal that is received and the quantized signal; and a compensation means for compensating the readout signal that is fed to the quantization filter by using the quantization error signal, wherein the optical disc comprises a plurality of marks arranged along tracks, the mark edge lengths of the marks being modulated with information, wherein the mark edge lengths have a negative symbol correlation between mark edges that are adjacent along the tracks and mark edges that are adjacent across the tracks, wherein the readout light beam has a spot diameter which is larger than the intervals of the marks both along the radius of the disc and along the tracks, and wherein the compensation means comprises an integral filter, and a subtractor for subtracting the output of the integral filter from the readout signal that is fed to the quantization filter, and wherein the negative symbol correlation exists when, on average, in a given track, if a particular pit is recorded to have a relatively shorter length then a subsequent pit is recorded to have a relatively longer length.

11. An information reproducing apparatus comprising:

an irradiation optical system for irradiating an optical disc with a readout light beam;

an optical head having a detection optical system for detecting a readout light beam reflected by the optical disc;

means for detecting a synchronization signal from a readout signal produced by the optical head and generating a sampling signal;

a sampling means for sampling the readout signal in accordance with the sampling signal;

a quantization filter for converting the readout signal sampled by the sampling means into a quantized signal, and outputting, as a quantization error signal, the difference between the readout signal that is received and the quantized signal; and a compensation means for compensating the readout signal that is fed to the quantization filter by using the quantization error signal, wherein the optical disc comprises a plurality of marks arranged along tracks, the mark edge lengths of the marks being modulated with information, wherein the mark edge lengths have a negative symbol correlation between mark edges that are adjacent along the tracks and mark edges that are adjacent across the tracks, wherein the readout light beam has a spot diameter which is larger than the intervals of the marks both along the radius of the disc and along the tracks, and further comprising two sets of the quantization filter and the compensation means, one set of the quantization filter and compensation means being adapted to process a readout signal sampled by an odd-numbered sampling signal, the other set of the quantization filter and compensation means being adapted to process a readout signal sampled by an even-numbered sampling signal, and wherein the negative symbol correlation exists when, on average, in a given track, if a particular pit is recorded to have a relatively shorter length then a subsequent pit is recorded to have a relatively longer length.

12. The information reproducing apparatus according to claim 11, wherein the optical disc comprises a plurality of marks arranged along the tracks such that the marks have substantially opposite phases between adjacent tracks, the mark edge lengths of the marks being modulated with information of multiple values, wherein the mark edge lengths having a negative symbol correlation between mark edges that are adjacent along the tracks and mark edges that are adjacent across the tracks, wherein the readout light beam has a spot diameter which is larger than the intervals of the marks both along the radius of the disc and along the tracks.

* * * * *